United States Patent
Terry et al.

(10) Patent No.: US 11,134,477 B2
(45) Date of Patent: Sep. 28, 2021

(54) METHOD AND APPARATUS FOR CARRIER ASSIGNMENT, CONFIGURATION AND SWITCHING FOR MULTICARRIER WIRELESS COMMUNICATIONS

(71) Applicant: INTERDIGITAL PATENT HOLDINGS, INC., Wilmington, DE (US)

(72) Inventors: Stephen E. Terry, Northport, NY (US); Guodong Zhang, Syosset, NY (US); Jin Wang, Princeton, NJ (US); Lei Wang, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/990,333

(22) Filed: Jan. 7, 2016

(65) Prior Publication Data

US 2016/0119912 A1    Apr. 28, 2016

Related U.S. Application Data

(63) Continuation of application No. 14/083,167, filed on Nov. 18, 2013, now Pat. No. 9,264,943, which is a
(Continued)

(51) Int. Cl.
*H04W 72/04* (2009.01)
*H04L 1/00* (2006.01)
(Continued)

(52) U.S. Cl.
CPC ...... *H04W 72/0406* (2013.01); *H04B 7/0626* (2013.01); *H04B 7/0632* (2013.01);
(Continued)

(58) Field of Classification Search
CPC .......... H04W 72/042; H04W 72/0413; H04W 72/0446; H04W 72/0406; H04W 76/046;
(Continued)

(56) References Cited

U.S. PATENT DOCUMENTS 5,455,960 A    10/1995    Pelchat et al.
5,796,726 A    8/1998    Hassan et al.
(Continued)

FOREIGN PATENT DOCUMENTS

CN    1605220 A    4/2005
CN    1647567 A    7/2005
(Continued)

OTHER PUBLICATIONS

3rd Generation Partnership Project (3GPP), "E-TFC Selection for DC-HSUPA", InterDigital, 3GPP TSG-RAN WG2, Conference Call, Aug. 11, 2009, 5 pages.
(Continued)

*Primary Examiner* — Jung H Park
(74) *Attorney, Agent, or Firm* — Condo Roccia Koptiw LLP

(57) ABSTRACT

As part of carrier assignment and configuration for multicarrier wireless communications, a single uplink (UL) primary carrier may provide control information for multiple concurrent downlink (DL) carriers. Optionally, control information for each DL carrier may be transmitted over paired UL carriers. Carrier switching of UL and/or DL carriers, including primary and anchor carriers, may occur during normal operation or during handover, and may occur in only the UL or only the DL direction. A unidirectional handover is performed when only an UL carrier or only a DL carrier is switched as part of a handover. Switching of UL and/or DL carriers may be from one component carrier or a
(Continued)

subset of carriers to another component carrier, another subset of carriers, or all carriers in the same direction.

6 Claims, 12 Drawing Sheets

Related U.S. Application Data continuation of application No. 12/723,416, filed on Mar. 12, 2010, now Pat. No. 8,620,334.

(60) Provisional application No. 61/160,106, filed on Mar. 13, 2009, provisional application No. 61/160,513, filed on Mar. 16, 2009.

(51) Int. Cl.
*H04L 5/00* (2006.01)
*H04W 36/00* (2009.01)
*H04B 7/06* (2006.01)
*H04L 1/18* (2006.01)

(52) U.S. Cl.
CPC .......... *H04L 1/0023* (2013.01); *H04L 1/1812* (2013.01); *H04L 5/003* (2013.01); *H04W 36/0016* (2013.01)

(58) Field of Classification Search
CPC ..... H04L 5/0053; H04L 5/001; H04L 5/0055; H04L 5/0048
See application file for complete search history.

(56) References Cited

U.S. PATENT DOCUMENTS

| | | |
|---|---|---|
| 7,299,048 B2 | 11/2007 | Lim et al. |
| 7,389,112 B2 | 6/2008 | Nilsson et al. |
| 7,961,700 B2 | 6/2011 | Malladi et al. |
| 8,019,287 B2 | 9/2011 | Harrison et al. |
| 8,169,953 B2 | 5/2012 | Damnjanovic et al. |
| 8,295,779 B2 | 10/2012 | Cave et al. |
| 8,391,910 B2 | 3/2013 | Heo et al. |
| 8,457,091 B2 | 6/2013 | Pani et al. |
| 8,514,820 B2 | 8/2013 | Cai et al. |
| 8,718,658 B2 | 5/2014 | Choi et al. |
| 8,774,123 B1 | 7/2014 | Baldemair et al. |
| 8,797,967 B2 | 8/2014 | Cheng et al. |
| 8,837,519 B2 | 9/2014 | Marco et al. |
| 8,868,088 B2 | 10/2014 | Cheng et al. |
| 9,048,784 B2 | 6/2015 | Chesnutt et al. |
| 9,191,939 B2 | 11/2015 | Liang et al. |
| 9,203,587 B2 | 12/2015 | Guan et al. |
| 9,277,546 B2 | 3/2016 | Baldemair et al. |
| 9,332,537 B2 | 5/2016 | Cheng |
| 9,356,765 B2 | 5/2016 | Wang et al. |
| 9,391,746 B2 | 7/2016 | Lee et al. |
| 9,445,428 B2 | 9/2016 | Baldemair et al. |
| 9,571,253 B2 | 2/2017 | Guan et al. |
| 9,596,599 B2 | 3/2017 | Xiao et al. |
| 9,655,118 B2 | 5/2017 | Kang et al. |
| 9,713,125 B2 | 7/2017 | Pani et al. |
| 9,743,360 B2 | 8/2017 | Baldemair et al. |
| 9,867,136 B2 | 1/2018 | Cheng |
| 10,178,632 B2 | 1/2019 | Loehr et al. |
| 10,225,050 B2 | 3/2019 | Guan et al. |
| 10,225,062 B2 | 3/2019 | Guan et al. |
| 10,404,417 B2 | 9/2019 | Feng et al. |
| 10,477,522 B2 | 11/2019 | Marinier et al. |
| 10,491,340 B2 | 11/2019 | Guan et al. |
| 2004/0057407 A1 | 3/2004 | Balachandran et al. |
| 2004/0106430 A1* | 6/2004 | Schwarz ............... H04W 28/18 455/552.1 |
| 2005/0277419 A1 | 12/2005 | Takano et al. |
| 2006/0111050 A1 | 5/2006 | Choi et al. |
| 2006/0221883 A1 | 10/2006 | Damnjanovic et al. |
| 2006/0274712 A1 | 12/2006 | Malladi et al. |
| 2006/0280142 A1 | 12/2006 | Damnjanovic et al. |
| 2007/0047502 A1 | 3/2007 | Marinier et al. |
| 2007/0073895 A1 | 3/2007 | Sebire et al. |
| 2007/0109964 A1 | 5/2007 | Kwak et al. |
| 2007/0133458 A1* | 6/2007 | Chandra ............... H04L 5/0055 370/329 |
| 2007/0183380 A1 | 8/2007 | Rensburg et al. |
| 2007/0258402 A1 | 11/2007 | Nakamata et al. |
| 2008/0101307 A1 | 5/2008 | Sindhushayana et al. |
| 2008/0151985 A1 | 6/2008 | Chin et al. |
| 2008/0253318 A1 | 10/2008 | Malladi et al. |
| 2009/0147869 A1 | 6/2009 | Duan et al. |
| 2010/0113004 A1 | 5/2010 | Cave et al. |
| 2010/0118817 A1* | 5/2010 | Damnjanovic ....... H04L 1/0026 370/329 |
| 2010/0130219 A1 | 5/2010 | Cave et al. |
| 2010/0142477 A1 | 6/2010 | Yokota |
| 2010/0172428 A1 | 7/2010 | Pani et al. |
| 2010/0232382 A1 | 9/2010 | Gauvreau et al. |
| 2011/0103323 A1 | 5/2011 | Wang et al. |
| 2011/0141928 A1 | 6/2011 | Shin et al. |
| 2011/0170508 A1 | 7/2011 | Xue et al. |
| 2011/0216677 A1 | 9/2011 | Ahmadi et al. |
| 2012/0135762 A1 | 5/2012 | Cheng et al. |
| 2012/0314679 A1 | 12/2012 | Lee et al. |
| 2013/0051264 A1 | 2/2013 | Wang et al. |
| 2013/0072208 A1 | 3/2013 | Marinier et al. |
| 2013/0170407 A1 | 7/2013 | Liang et al. |
| 2013/0178221 A1* | 7/2013 | Jung .................... H04L 9/0844 455/450 |
| 2013/0235829 A1 | 9/2013 | Pani et al. |
| 2014/0044092 A1 | 2/2014 | Guan et al. |
| 2014/0071946 A1 | 3/2014 | Terry et al. |
| 2014/0173682 A1 | 6/2014 | Xiao et al. |
| 2014/0293927 A1 | 10/2014 | Chun et al. |
| 2014/0321395 A1 | 10/2014 | Baldemair et al. |
| 2016/0020879 A1 | 1/2016 | Shimezawa et al. |
| 2016/0050059 A1 | 2/2016 | Guan et al. |
| 2016/0174249 A1 | 6/2016 | Baldemair et al. |
| 2016/0242193 A1 | 8/2016 | Hong et al. |
| 2016/0248545 A1 | 8/2016 | Cheng |
| 2016/0330698 A1 | 11/2016 | Loehr et al. |
| 2016/0381642 A1 | 12/2016 | Baldemair et al. |
| 2017/0111156 A1 | 4/2017 | Guan et al. |
| 2017/0188235 A1 | 6/2017 | Xiao et al. |
| 2017/0280433 A1 | 9/2017 | Pani et al. |
| 2017/0331596 A1 | 11/2017 | Guan et al. |
| 2018/0062796 A1 | 3/2018 | Feng et al. |
| 2018/0132265 A1 | 5/2018 | Guan et al. |
| 2018/0302890 A1 | 10/2018 | Marinier et al. |
| 2019/0149277 A1 | 5/2019 | Guan et al. |

FOREIGN PATENT DOCUMENTS

| | | |
|---|---|---|
| CN | 1663300 A | 8/2005 |
| CN | 1973461 A | 5/2007 |
| CN | 101056152 A | 10/2007 |
| CN | 101175304 A | 5/2008 |
| CN | 101185278 A | 5/2008 |
| CN | 101204050 A | 6/2008 |
| CN | 101268709 A | 9/2008 |
| CN | 101282197 A | 10/2008 |
| CN | 102349259 B | 12/2016 |
| EP | 1502451 A1 | 2/2005 |
| EP | 2675231 A2 | 12/2013 |
| JP | 2005-512430 A | 4/2005 |
| JP | 2008-182734 A | 8/2008 |
| JP | 2008-187377 A | 8/2008 |
| JP | 2008-538061 A | 10/2008 |
| JP | 2008-539667 A | 11/2008 |
| JP | 2008-546255 A | 12/2008 |
| JP | 2009-512321 A | 3/2009 |
| JP | 2012-520616 A | 9/2012 |
| KR | 10-2003-0007481 A | 1/2003 |
| KR | 10-2006-0057059 A | 5/2006 |
| KR | 10-0675489 B1 | 1/2007 |
| KR | 10-2007-0114623 A | 12/2007 |
| KR | 10-2008-0016652 A | 2/2008 |

(56) References Cited

FOREIGN PATENT DOCUMENTS

| | | |
|---|---|---|
| TW | 2007-08018 A | 2/2007 |
| TW | 2008-05924 A | 1/2008 |
| TW | 2008-32966 A | 8/2008 |
| TW | 2009-08633 A | 2/2009 |
| WO | WO 2001/076110 A2 | 10/2001 |
| WO | WO 2003/094541 A1 | 11/2003 |
| WO | WO 2006/125149 A2 | 11/2006 |

OTHER PUBLICATIONS

3rd Generation Partnership Project (3GPP), R1-080356, "Notion of Anchor Carrier in LTE-A", Qualcomm Europe, 3GPP TSG RAN WG1 #55bis, Ljubljana, Slovenia, Jan. 12-16, 2009, pp. 1-5.
3rd Generation Partnership Project (3GPP), R1-082468, "Carrier Aggregation in LTE-Advanced", Ericsson, TSG-RAN WG1 #53bis, Warsaw, Poland, Jun. 30-Jul. 4, 2008, 6 pages.
3rd Generation Partnership Project (3GPP), R1-082848, "General Control Channel Design for LTE-A", ZTE, 3GPP TSG-RAN WG1 #54, Jeju, Korea, Aug. 18-22, 2008, 3 pages.
3rd Generation Partnership Project (3GPP), R1-084194, "Proposals and Issues on the Carrier Aggregation and Control", LG Electronics, 3GPP Tsg ran WG1 #55, Prague, Czech Republic, Nov. 10-14, 2008, 6 pages.
3rd Generation Partnership Project (3GPP), R1-090126, "PUCCH Design for Carrier Aggregation", Huawei, 3GPP TSG RAN WG1#55bis, Ljubljana, Slovenia, Jan. 12-16, 2009, 6 pages.
3rd Generation Partnership Project (3GPP), R1-090268, "Control Channel Design Issues for Carrier Aggregation in LTE-A", Motorola, 3GPP TSG RAN1#55bis, Ljubljana, Slovenia, Jan. 12-16, 2009, 3 pages.
3rd Generation Partnership Project (3GPP), R1-090356, "Notion of Anchor Carrier in LTE-A", Qualcomm Europe, 3GPP TSG RAN WG1 #55bis, Ljubljana, Slovenia, Jan. 12-16, 2009, 17 pages.
3rd Generation Partnership Project (3GPP), R1-090584, "Downlink and Uplink Control to Support Carrier Aggregation", Texas Instruments, 3GPP TSG RAN WG1 #56, Athens, Greece, Feb. 9-13, 2009, 5 pages.
3rd Generation Partnership Project (3GPP), R1-090629, "Uplink Control Channel Design for LTE-Advanced", ZTE, 3GPP TSG RAN WG1 Meeting #56, Athens, Greece, Feb. 9-13, 2009, 5 pages.
3rd Generation Partnership Project (3GPP), R1-090735, "Primary Component Carrier Selection, Monitoring, and Recovery", Nokia Siemens Networks, Nokia, 3GPP TSG RAN WG1 #56 Meeting, Athens, Greece, Feb. 9-13, 2009, 6 pages.
3rd Generation Partnership Project (3GPP), R1-090813, "PUCCH Design for Carrier Aggregation", Huawei, 3GPP TSG RAN WG1 Meeting #56, Athens, Greece, Feb. 9-13, 2009, 6 pages.
3rd Generation Partnership Project (3GPP), R1-090814, "Component Carrier Structures", Huawei, 3GPP TSG RAN WG1 Meeting #56, Athens, Greece, Feb. 9-13, 2009, 3 pages.
3rd Generation Partnership Project (3GPP), R1-090860, "Notion of Anchor Carrier in LTE-A", Qualcomm Europe, 3GPP TSG RAN WG1 #56, Athens, Greece, Feb. 9-13, 2009, 5 pages.
3rd Generation Partnership Project (3GPP), R1-090939, "UL Control Channel Scheme for LTE-A", CATT, RITT, 3GPP TSG RAN WG1 meeting #56, Athens, Greece, Feb. 9-13, 2009, 6 pages.
3rd Generation Partnership Project (3GPP), R1-090952, "Anchor Component Carrier and Preferred Control Signal Structure", Fujitsu, 3GPP TSG-RAN1 #56, Athens, Greece, Jan. 9-13, 2009, pp. 1-5.
3rd Generation Partnership Project (3GPP), R1-092762, "DC-HSUPA—E-TFC Selection System Simulation Results", Ericsson, ST-Ericsson, 3GPP TSG RAN WG1 Meeting #57bis, Los Angeles, CA, USA, Jun. 29-Jul. 3, 2009, 9 pages.
3rd Generation Partnership Project (3GPP), R2-054557, "Report of RAN2 Conference Call on E-TFC Selection Algorithm for DCHSUPA", RAN2 Vice-Chairman [Rapporteur], 3GPP TSG-RAN WG2 meeting #67, Shenzhen, P.R. of China, Aug. 24-28, 2009, 2 pages.

3rd Generation Partnership Project (3GPP), R2-062912, "Uplink Resource Allocation Scheme (Dynamic Scheduling)", NTT DoCoMo, Inc., 3GPP TSG RAN WG2 #55, Seoul, Korea, Oct. 9-13, 2006, 3 pages.
3rd Generation Partnership Project (3GPP), R2-085128, "Happy Bit Setting with Improved L2 for UL", Interdigital et al., 3GPP TSG-WG2 Meeting #63bis, R2-085128.
3rd Generation Partnership Project (3GPP), R2-093920, "[66#9] LTE-UMTS: Inbound Mobility to CSG Cell from LTE Cell", Email Discussion Rapporteur (Motorola), 3GPP TSG-RAN WG2#66bis, Los Angeles, U.S.A., Jun. 29-Jul. 3, 2009, pp. 1-29.
3rd Generation Partnership Project (3GPP), R2-094087, "Report of 3GPP TSG RAN WG2 Meeting #66, San Francisco, USA, May 4-8, 2009", ETSI MCC, TSG-RAN Working Group 2 Meeting #66bis, Los Angeles, USA, Jun. 29-Jul. 3, 2009, pp. 1-151.
3rd Generation Partnership Project (3GPP), R2-094372, "On Usage of Happy Bits in Dual Carrier HSUPA", Nokia Siemens Networks, 3GPP TSG-RAN WG2 Meeting #67, Shenzhen, China, Aug. 24-28, 2009, 5 pages.
3rd Generation Partnership Project (3GPP), R2-094383, "Happy Bit for DC-HSUPA", Ericsson, ST-Ericsson, 3GPP TSG RAN WG2 #67, Shenzhen, China, Aug. 24-28, 2009, pp. 1-3.
3rd Generation Partnership Project (3GPP), R2-094385, "Scheduling Information for DC-HSUPA", Ericsson, ST-Ericsson, 3GPP TSG RAN WG2 #67, Shenzhen, China, Aug. 24-28, 2009, pp. 1-3.
3rd Generation Partnership Project (3GPP), R2-094452, "Triggering and Reporting of SI and Happy Bit in DC-HSUPA", Qualcomm Europe, 3GPP TSG-RAN WG2 #67, Shenzhen, P.R. China, Aug. 24-28, 2009, pp. 1-3.
3rd Generation Partnership Project (3GPP), R2-094541, "SI Report for DC-HSUPA", Huawei, 3GPP TSG RAN WG2 Meeting #67, Shenzhen, China, Aug. 24-28, 2009, pp. 1-4.
3rd Generation Partnership Project (3GPP), R2-094542, "Happy Bit for DC-HSUPA", Huawei, 3GPP TSG RAN WG2 Meeting #67, Shenzhen, China, Aug. 24-28, 2009, pp. 1-4.
3rd Generation Partnership Project (3GPP), R2-094795, "On the Usage of the Happy Bits for DC-HSUPA", InterDigital, 3GPP TSG-RAN WG2 Meeting #67, Shenzhen, China, Aug. 24-28, 2009, 3 pages.
3rd Generation Partnership Project (3GPP), R2-095663, "Happy Bits Usage for DC-HSUPA", InterDigital, 3GPP TSG-RAN WG2 Meeting #67bis, Miyazaki, Japan, Oct. 12-16, 2009, 4 pages.
3rd Generation Partnership Project (3GPP), R2-095716, "Definition for the Happy Bit", Ericsson, ST-Ericsson, 3GPP TSG RAN WG2 #67bis, Miyazaki, Japan, Oct. 12-16, 2009, 7 pages.
3rd Generation Partnership Project (3GPP), R2-09XXXX, "E-TFC Selection in DC-HSUPA", Qualcomm Europe, 3GPP TSG-RAN WG2 #67, Shenzhen, P.R. China, Mar. 24-Aug. 28, 2009, pp. 1-7.
3rd Generation Partnership Project (3GPP), R2-09XXXX, "On Greedy Filling Power Allocation in E-TFC Selection for DC-HSUPA", Alcatel-Lucent, 3GPP TSG-RAN WG2 Meeting #67, Shenzhen, China, Aug. 24-28, 2009, 6 pages.
3rd Generation Partnership Project (3GPP), RP-080490, "Dual-Cell HSDPA Operation on Adjacent Carriers", 3GPP TSG RAN #40, Prague, Czech Republic, May 27-30, 2008, 4 pages.
3rd Generation Partnership Project (3GPP), RP-090351, "Support of Home NB and Home eNB Enhancements RAN2 Aspects", Huawei, Alcatel-Lucent, TSG-RAN Meeting #43, Biarritz, France, Mar. 3-6, 2009, 5 pages.
3rd Generation Partnership Project (3GPP), TR 36.913 V8.0.0, "Technical Specification Group Radio Access Network, Requirements for Further Advancements for E-UTRA (LTE-Advanced) (Release 8)", Jun. 2008, pp. 1-14.
3rd Generation Partnership Project (3GPP), TR 36.913 V8.0.1, "Technical Specification Group Radio Access Network, Requirements for Further Advancements for Evolved Universal Terrestrial Radio Access (E-UTRA) (LTE-Advanced) (Release 8)", Mar. 2009, pp. 1-15.
3rd Generation Partnership Project (3GPP), TR 36.913 V9.0.0, "Technical Specification Group Radio Access Network, Requirements for Further Advancements for Evolved Universal Terrestrial Radio Access (E-UTRA) (LTE-Advanced) (Release 9)", Dec. 2009, pp. 1-15.

(56) References Cited

OTHER PUBLICATIONS

3rd Generation Partnership Project (3GPP), TS 25.133 V8.4.0, "Technical Specification Group Radio Access Network, Requirements for Support of Radio Resource Management (FDD) (Release 8)", Sep. 2008, pp. 1-198.
3rd Generation Partnership Project (3GPP), TS 25.133 V8.8.0, "Technical Specification Group Radio Access Network, Requirements for Support of Radio Resource Management (FDD) (Release 8)", Sep. 2009, pp. 1-235.
3rd Generation Partnership Project (3GPP), TS 25.133 V9.1.0, "Technical Specification Group Radio Access Network, Requirements for Support of Radio Resource Management (FDD) (Release 9)", Sep. 2009, pp. 1-236.
3rd Generation Partnership Project (3GPP), TS 25.214 V8.7.0, "Technical Specification Group Radio Access Network, Physical Layer Procedures (FDD) (Release 8)", Sep. 2009, pp. 1-93.
3rd Generation Partnership Project (3GPP), TS 25.214 V9.0.0, "Technical Specification Group Radio Access Network, Physical Layer Procedures (FDD) (Release 9)", Sep. 2009, pp. 1-95.
3rd Generation Partnership Project (3GPP), TS 25.308 V8.3.0, "Technical Specification Group Radio Access Network, High Speed Downlink Packet Access (HSDPA), Overall Description, Stage 2 (Release 8)", Sep. 2008, pp. 1-56.
3rd Generation Partnership Project (3GPP), TS 25.308 V8.7.0, "Technical Specification Group Radio Access Network, High Speed Downlink Packet Access (HSDPA), Overall Description, Stage 2 (Release 8)", Sep. 2009, pp. 1-65.
3rd Generation Partnership Project (3GPP), TS 25.308 V9.1.0, "Technical Specification Group Radio Access Network, High Speed Downlink Packet Access (HSDPA), Overall Description, Stage 2 (Release 9)", Sep. 2009, pp. 1-65.
3rd Generation Partnership Project (3GPP), TS 25.321 V8.3.0, "Technical Specification Group Access Network, Medium Access Control (MAC) Protocol Specification (Release 7)", Sep. 2008.
3rd Generation Partnership Project (3GPP), TS 25.321 V8.7.0, "Technical Specification Group Radio Access Network, Medium Access Control (MAC) Protocol Specification (Release 8)", Sep. 2009, pp. 1-187.
3rd Generation Partnership Project (3GPP), TS 25.321 V9.0.0, "Technical Specification Group Radio Access Network, Medium Access Control (MAC) Protocol Specification (Release 9)", Sep. 2009, pp. 1-187.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213, V9.0.1, "Technical Specification Group Radio Access Network, Evolved Universal Terrestrial Radio Access (E-UTRA), Physical Layer Procedures (Release 9)", Dec. 2009, pp. 1-79.
3rd Generation Partnership Project (3GPP), TS 36.300 V.8.7.0, "Technical Specification Group Radio Access Network, Evolved Universal Terrestrial Radio Access (E-UTRA) and Evolved Universal Terrestrial Radio Access Network (E-UTRAN), Stage 2 (Release 8)", Dec. 2008, pp. 1-144.
3rd Generation Partnership Project (3GPP), TS 36.300 V8.11.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2009, pp. 1-148.
3rd Generation Partnership Project (3GPP), TS 36.300 V9.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Dec. 2009, pp. 1-178.
3rd Generation Partnership Project (3GPP), TS 36.321 V8.3.0, "Technical Specification Group Radio Access Network, Evolved Universal Terrestrial Radio Access (E-UTRA) Medium Access Control (MAC) Protocol Specification (Release 8)", Sep. 2008, pp. 1-36.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.
3rd Generation Partnership Project (3GPP), TS 36.321 V8.8.0, "Technical Specification Group Radio Access Network, Evolved Universal Terrestrial Radio Access (E-UTRA) Medium Access Control (MAC) Protocol Specification (Release 8)", Dec. 2009, pp. 1-47.
3rd Generation Partnership Project (3GPP), TS 36.321 V9.1.0, "Technical Specification Group Radio Access Network, Evolved Universal Terrestrial Radio Access (E-UTRA) Medium Access Control (MAC) Protocol Specification (Release 9)", Dec. 2009, pp. 1-48.
3rd Generation Partnership Project (3GPP),TS 25.214 V8.3.0, "Technical Specification Group Radio Access Network, Physical Layer Procedures (FDD) (Release 8)", Sep. 2008, pp. 1-89.
Lin-Lin, Yang, "Research on Handover Mechanism in 3GPP LTE System", Communications Technology, vol. 41, No. 08, 2008, pp. 1-4.
Murias, Ron, "IEEE 802.16m Amendment Working Document", InterDigital Communications, LLC, IEEE 802.16m-09/0010, IEEE 802.16 Broadband Wireless Access Working Group http://ieee802.org/16, Jan. 29, 2009, 51 pages.
3rd Generation Partnership Project (3GPP), R1-083730, "L1 Control Signaling With Carrier Aggregation in LTE-Advanced", Nokia, Nokia Siemens Networks, 3GPP TSG-RAN WG1 Meeting #54bis, Prague, Czech Republic, Sep. 29-Oct. 3, 2008, 6 pages.
3rd Generation Partnership Project (3GPP), R1-082448, "Carrier Aggregation in Advanced E-UTRA", Huawei, 3GPP TSG RAN WG1#53bis, Warsaw, Poland, Jun. 30-Jul. 4, 2008, 4 pages.
3rd Generation Partnership Project (3GPP), R1-090646, "On Component Carrier Types and Support for LTE-A Features", NEC Group, 3GPP TSG-RAN WG1 Meeting #56, Athens, Greece, Feb. 9-13, 2009, 4 pages.
Wang, et al., "The Evolution of LTE Physical Layer Control Channels", IEEE Communications Surveys & Tutorials, vol. 18, No. 2, Dec. 18, 2015, 19 pages.

* cited by examiner

METHOD AND APPARATUS FOR CARRIER ASSIGNMENT, CONFIGURATION AND SWITCHING FOR MULTICARRIER WIRELESS COMMUNICATIONS

CROSS REFERENCE TO RELATED APPLICATIONS

This application is a continuation of U.S. patent application Ser. No. 14/083,167, filed Nov. 18, 2013, which is a continuation of U.S. patent application Ser. No. 12/723,416, filed Mar. 12, 2010, issued as U.S. Pat. No. 8,620,334 on Dec. 31, 2013, which claims the benefit of U.S. Provisional Application No. 61/160,106 filed Mar. 13, 2009, and U.S. Provisional Application No. 61/160,513 filed Mar. 16, 2009 which are incorporated by reference as if fully set forth.

FIELD OF INVENTION

This application is related to wireless communications.

BACKGROUND

In multicarrier communications, reporting of downlink (DL) control information on the uplink (UL) is typically done for one DL carrier at a time. Therefore, existing multicarrier communication systems are lacking techniques for reporting control information on the UL for multiple concurrent DL carriers.

An example multicarrier wireless communications system is the Third Generation Partnership Project (3GPP) long term evolution (LTE) system that has been introduced into 3GPP Release 8 (R8). The LTE DL transmission scheme is based on an Orthogonal Frequency Division Multiple Access (OFDMA) air interface. According to OFDMA, a wireless transmit/receive unit (WTRU) may be allocated by the evolved Node B (eNB) to receive its data anywhere across the whole LTE transmission bandwidth. For the LTE uplink (UL) direction, single-carrier (SC) transmission is used based on discrete Fourier transform-spread-OFDMA (DFT-S-OFDMA), or equivalently, single carrier frequency division multiple access (SC-FDMA). A WTRU in the UL may transmit only on a limited, yet contiguous set of assigned sub-carriers in an FDMA arrangement. FIG. 1 illustrates the mapping of a transport block 102 to an LTE carrier 110, for UL or DL transmission. Layer 1 (L1) 106 receives information from the hybrid automatic repeat request (HARQ) entity 104 and the scheduler 108, and uses it to assign a transport block 102 to an LTE carrier 110. As shown in FIG. 1, an UL or DL LTE carrier 110, or simply a carrier 110, is made up of multiple sub-carriers 112. An eNB may receive a composite UL signal across the entire transmission bandwidth from one or more WTRUs at the same time, where each WTRU transmits on a subset of the available transmission bandwidth or sub-carriers.

LTE-Advanced (LTE-A) is being developed by the 3GPP standardization body in order to further improve achievable throughput and coverage of LTE-based radio access systems, and to meet the International Mobile Telecommunications (IMT) Advanced requirements of 1 Gbps and 500 Mbps in the DL and UL directions, respectively. Among the improvements proposed for LTE-A are carrier aggregation and support of flexible bandwidth arrangements. LTE-A proposes to allow DL and UL transmission bandwidths to exceed the 20 MHz limit in R8 LTE, for example, permitting 40 MHz or 100 MHz bandwidths. In this case, a carrier may occupy the entire frequency block.

LTE-A proposes to allow for more flexible usage of the available paired spectrum, and is not limited to operate in symmetrical and paired FDD mode, as in R8 LTE. LTE-A proposes to allow asymmetric configurations where, for example, a DL bandwidth of 10 MHz may be paired with an UL bandwidth of 5 MHz. In addition, LTE-A proposes composite aggregate transmission bandwidths, which may be backwards compatible with LTE. By way of example, the DL may include a first 20 MHz carrier plus a second 10 MHz carrier, which is paired with an UL 20 MHz carrier. Carriers transmitted concurrently in the same UL or DL direction are referred to as component carriers. The composite aggregate transmission bandwidths of the component carriers may not necessarily be contiguous in the frequency domain. For example, the first 10 MHz component carrier may be spaced by 22.5 MHz in the DL band from the second 5 MHz DL component carrier. Alternatively, contiguous aggregate transmission bandwidths may be used. By way of example, a first DL component carrier of 15 MHz may be aggregated with another 15 MHz DL component carrier and paired with an UL carrier of 20 MHz. FIG. 2 shows a discontinuous spectrum aggregation with component carriers 205, and FIG. 3 shows a continuous spectrum aggregation with component carriers 305.

FIG. 4 illustrates a reserved time-frequency location for the transmission of the physical uplink control channel (PUCCH) according to LTE R8. PUCCH is used for transmitting control data on the uplink. FIG. 4 shows one subframe made up of two timeslots 402, where $N_{RB}^{UL}$ denotes the number of resource blocks (RBs) available for uplink transmission and $n_{PRB}$ is the RB index. RBs on the edges of the frequency spectrum may be used for PUCCH transmission, and RBs on the opposite edges may be used in the two time slots to improve the diversity. By way of example, a WTRU may use the RBs indicated by m=1 for PUCCH transmission. The control data carried by PUCCH may include, but is not limited to, acknowledge/negative acknowledge (ACK/NACK) information for the DL transmission, scheduling requests (SRs), channel quality indicator (CQI) information to enable scheduling for DL transmission, rank indicator (RI) information, and precoding matrix indicator (PMI) information to enable MIMO operation. Herein, the term CQI is generalized to also include PMI and RI. According to LTE R8, PUCCH used for CQI reporting and PUCCH used for scheduling requests (SRs) are configured to be periodic, such that each PUCCH reports information for only one downlink carrier.

The PUCCH configuration in LTE R8 is designed for one component carrier. Therefore, it is desirable to develop new configurations for PUCCH for LTE-A with carrier aggregation, where more than one component carrier may be transmitted at a time in the DL, while supporting CQI (including PMI and RI) reporting for multiple downlink carriers, and efficient SR reporting with low impact from discontinuous reception (DRX) cycles on multiple carriers. More generally, it is desirable to develop techniques for simultaneous reporting of information for multiple concurrent DL carriers in multicarrier communications systems.

A multicarrier system employing carrier aggregation, such as LTE-A, may include anchor and non-anchor component carriers. This may reduce the overhead because system information, synchronization and paging information for a cell may be transmitted on anchor carrier(s) only. The anchor carrier(s) may enable synchronization, camping and access in a heterogeneous network environment where interference coordination may be provided for at least one detectable or accessible anchor carrier.

Multiple carriers may exist in the DL and UL for carrier aggregation. However, the carrier quality may change and/or the amount of DL or UL traffic may change in a dynamic or semi-persistent way. Thus, it would be desirable to provide flexible and efficient DL and UL component carrier assignment and switching to provide improved utilization and transmission quality for multiple carrier systems employing carrier aggregation, such as LTE-A.

SUMMARY

A method and apparatus for carrier assignment, configuration and switching for multicarrier wireless communications are disclosed. A single uplink (UL) primary carrier may provide control information for multiple concurrent downlink (DL) carriers. Optionally, DL carriers may be paired with UL carriers, such that control information for each DL carrier is transmitted over its paired UL carrier. Carrier switching of UL and/or DL carriers, including primary and anchor carriers, may be initiated by the wireless transmit/receive unit (WTRU) or the evolved Node B (eNB) and may occur during normal operation or during handover. Switching of carriers in only the UL or only the DL direction may occur. A unidirectional handover is performed when only an UL carrier or only a DL carrier is switched as part of a handover. Switching of UL and/or DL carriers may be from one component carrier to another component carrier, a subset of carriers, or all carriers in the same direction. Alternatively, carrier switching may be from a subset of carriers to one component carriers, another subset of carriers, or all the carriers in the same direction.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The embodiments described herein are applicable to any system employing multi-carrier communications including, but not limited to, orthogonal frequency divisional multiple access (OFDMA) and orthogonal frequency divisional multiplexing (OFDM). Examples of wireless communications systems employing multicarrier communications include, but are not limited to, Long Term Evolution (LTE), LTE Advanced (LTE-A), Institute of Electrical and Electronic Engineers (IEEE) 802.11, IEEE 802.16m, and Worldwide Interoperability for Microwave Access (WiMAX). The embodiments below are described by way of example based on LTE and LTE-A technology, but are not limited to these technologies and can be applied to any multi-carrier communications system. Feedback information and/or control information is referred to herein as control information.

Figure 1:
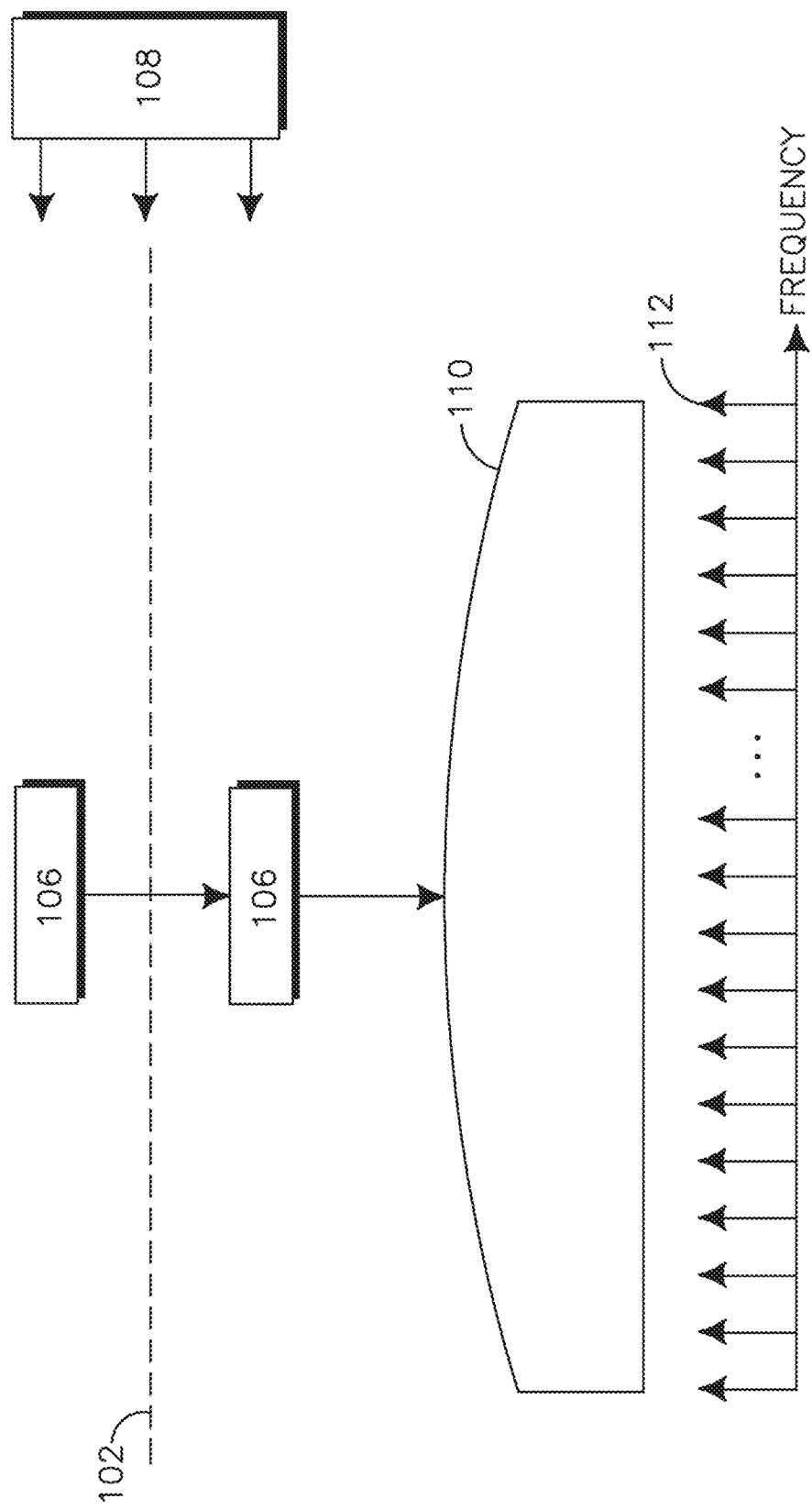
FIG. 1 shows a mapping of a transport block to an LTE carrier according to LTE R8.
Figure 2:
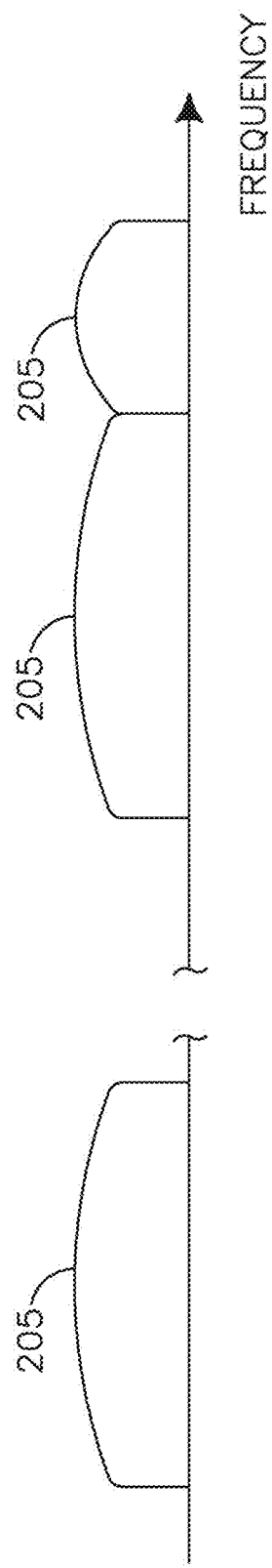
FIG. 2 shows a discontinuous spectrum aggregation according to LTE-A.
Figure 3:
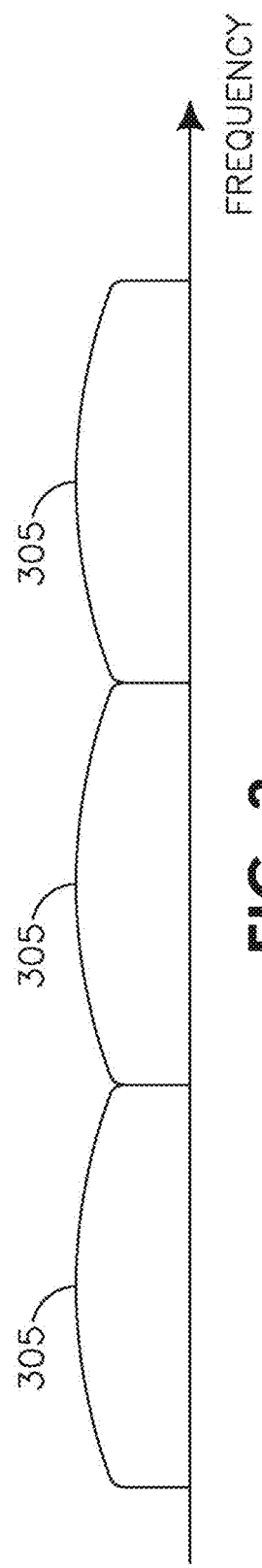
FIG. 3 shows a continuous spectrum aggregation according to LTE-A.
Figure 4:
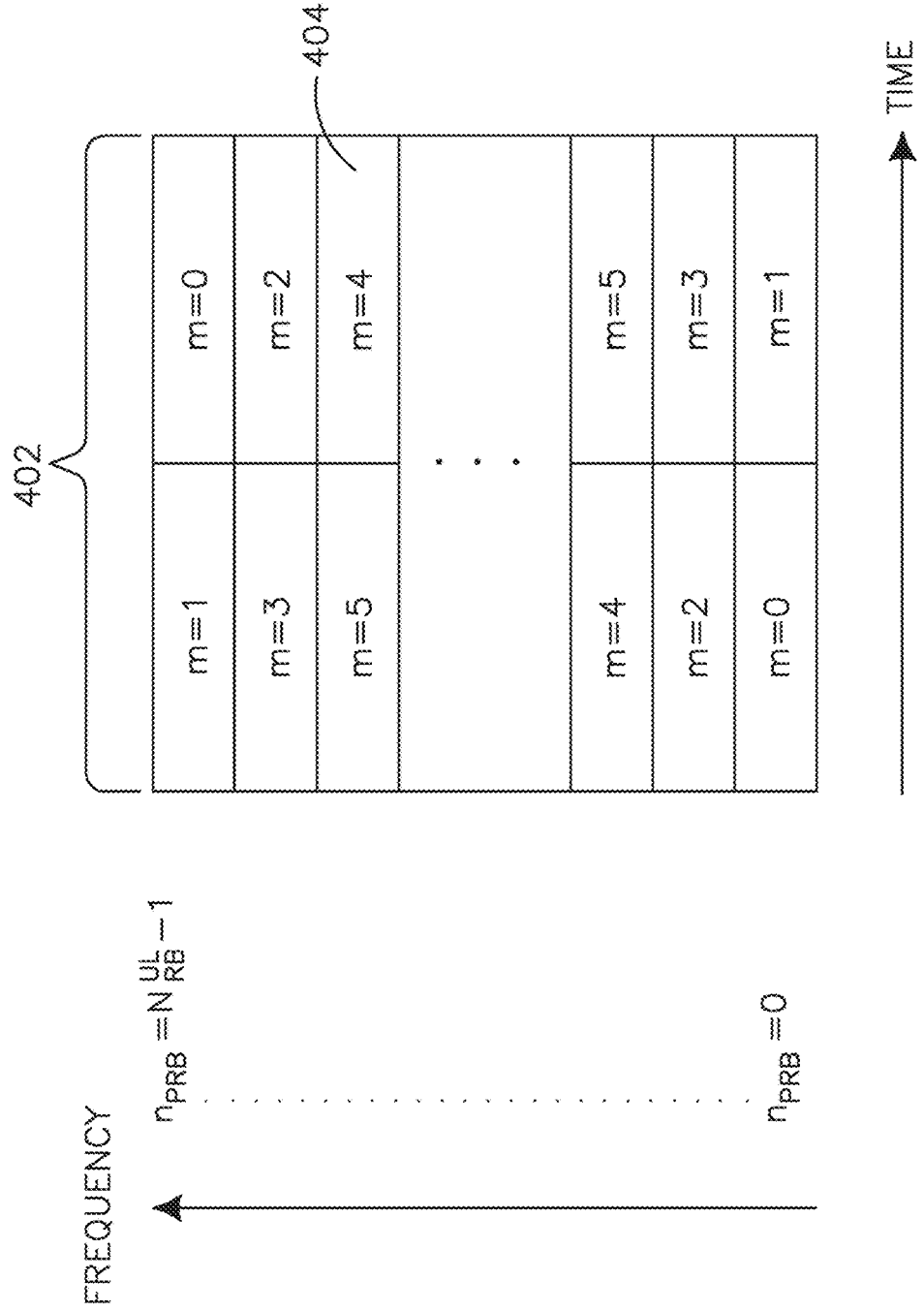
FIG. 4 shows an LTE PUCCH structure.
Figure 5:
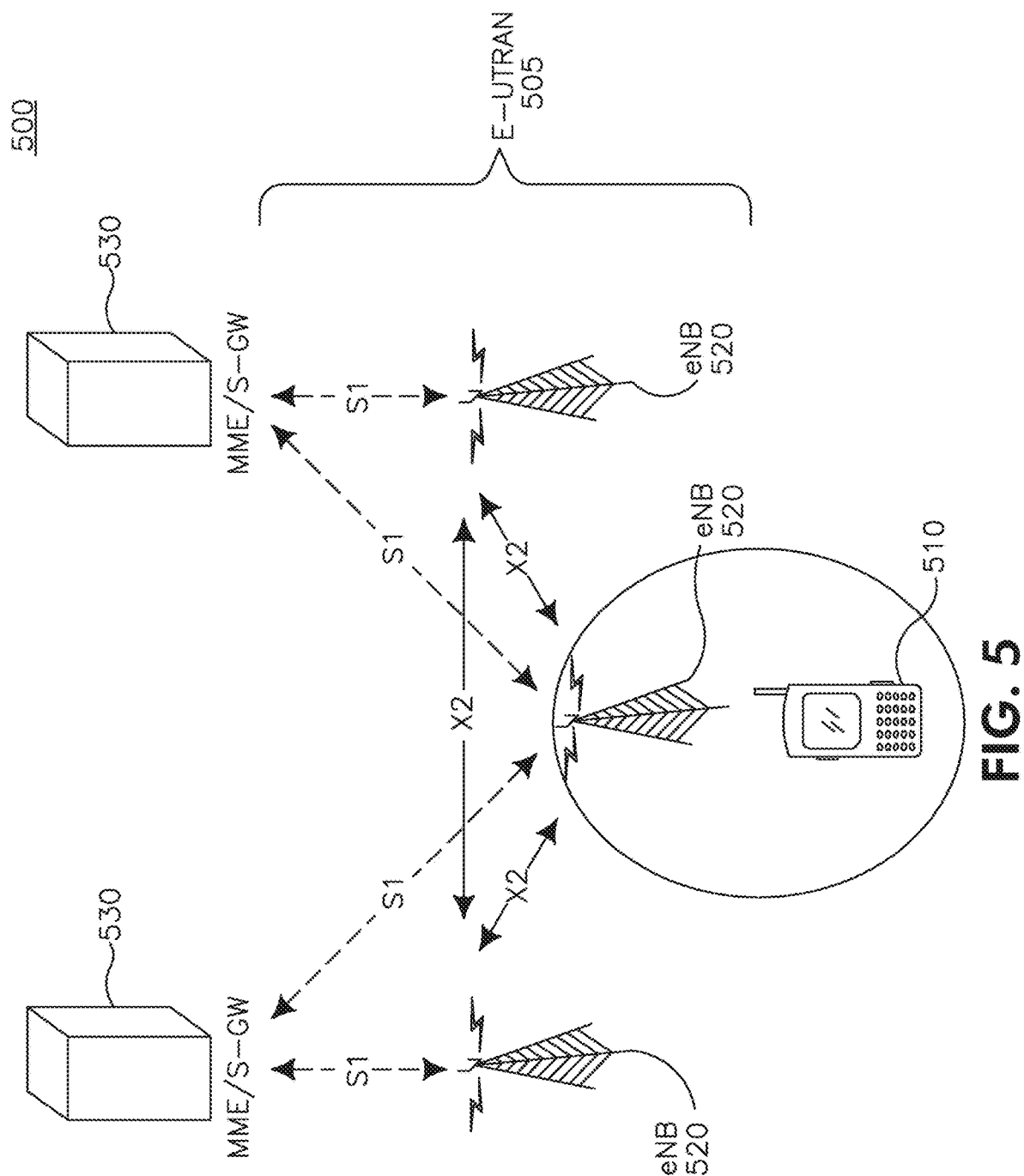
FIG. 5 shows an example wireless communication system including a plurality of wireless transmit/receive units (WTRUs) and an evolved Node B (eNB)

FIG. 5 shows a Long Term Evolution (LTE) wireless communication system/access network 500 that includes an Evolved-Universal Terrestrial Radio Access Network (E-UTRAN) 505. The E-UTRAN 505 includes several evolved Node-Bs, (eNBs) 520. The WTRU 510 is in communication with an eNB 520. The eNBs 520 interface with each other using an X2 interface. Each of the eNBs 520 interface with a Mobility Managements Entity (MME)/Serving GateWay (S-GW) 530 through an S1 interface. Although a single WTRU 510 and three eNBs 520 are shown in FIG. 5, it should be apparent that any combination of wireless and wired devices may be included in the wireless communication system access network 500.

Figure 6:
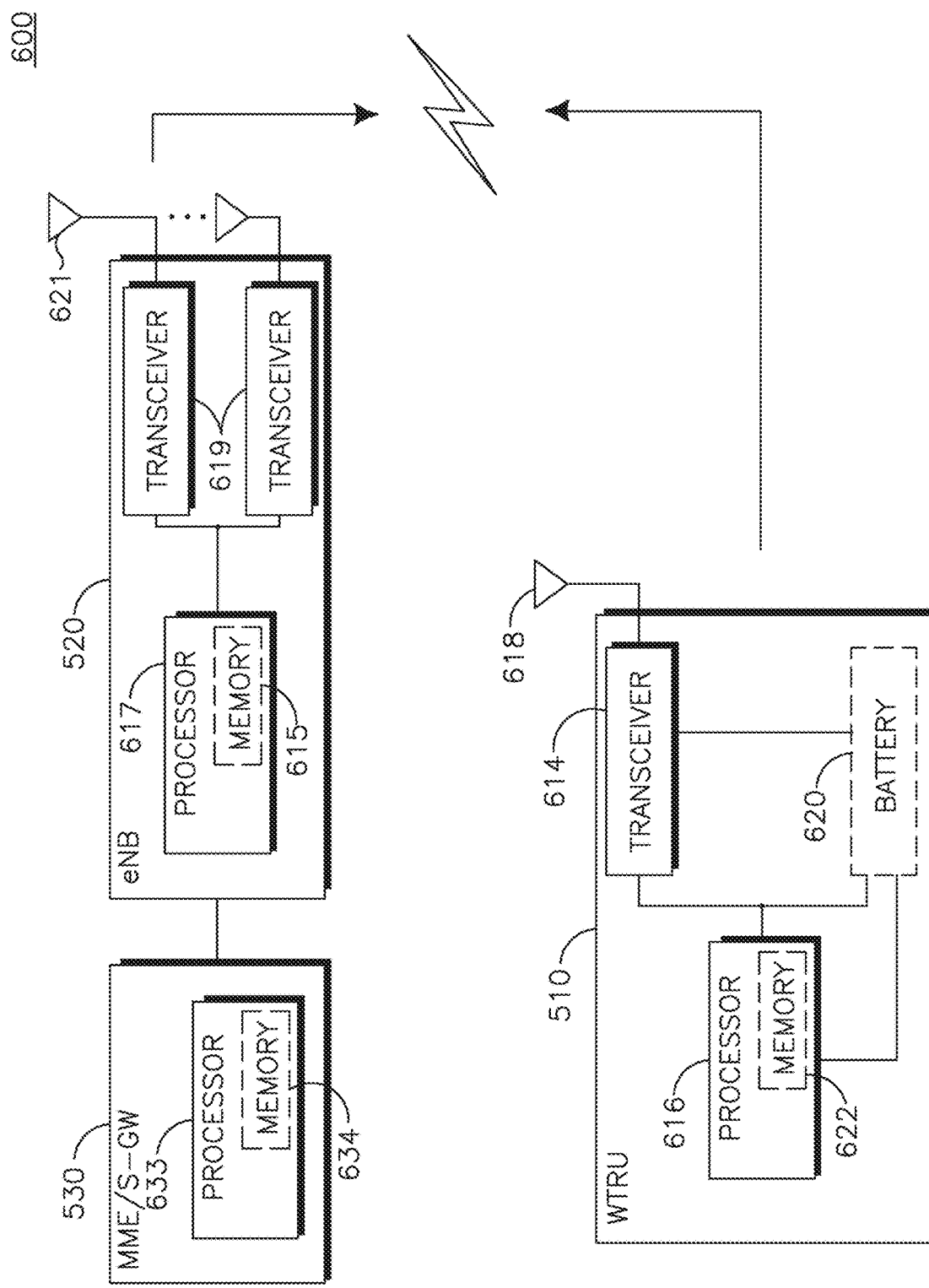
FIG. 6 shows an example functional block diagram of a WTRU and eNB of FIG. 5.

FIG. 6 is an example block diagram of an LTE wireless communication system 600 including the WTRU 510, the eNB 520, and the MME/S-GW 530. As shown in FIG. 6, the WTRU 510, the eNB 520 and the MME/S-SW 530 are configured to perform is method of carrier assignment and switching for multicarrier wireless communications.

In addition to the components that may be found in a typical WTRU, the WTRU 510 includes a processor 616 with an optional linked memory 622, at least one transceiver 614, an optional battery 620, and an antenna 618. The processor 616 is configured to perform a method of carrier assignment and switching for multicarrier wireless communications. The transceiver 614 is in communication with the processor 616 and the antenna 618 to facilitate the transmission and reception of wireless communications. In case a battery 620 is used in the WTRU 510, it powers the transceiver 614 and the processor 616.

In addition to the components that may be found in a typical eNB, the eNB 520 includes a processor 617 with an optional linked memory 615, transceivers 619, and antennas 621. The processor 617 is configured to perform a method of carrier assignment and switching for multicarrier wireless communications. The transceivers 619 are in communication with the processor 617 and antennas 621 to facilitate the transmission and reception of wireless communications. The eNB 520 is connected to the Mobility Management Entity/Serving Gate Way (MME/S-GW) 530 which includes a processor 633 with an optional linked memory 634.

In a first embodiment, control information for any number of DL carriers may be provided on a single UL carrier, referred to herein as the primary UL carrier. The primary carrier may be an UL anchor carrier or any other type of UL carrier. The primary carrier may be defined as the carrier assigned to carry the control information for the DL carriers. Optionally, there may be multiple primary carriers such that each DL carrier is paired with an UL carrier, so that control information for each DL carrier may be transmitted on its corresponding primary carrier.

Figure 7:
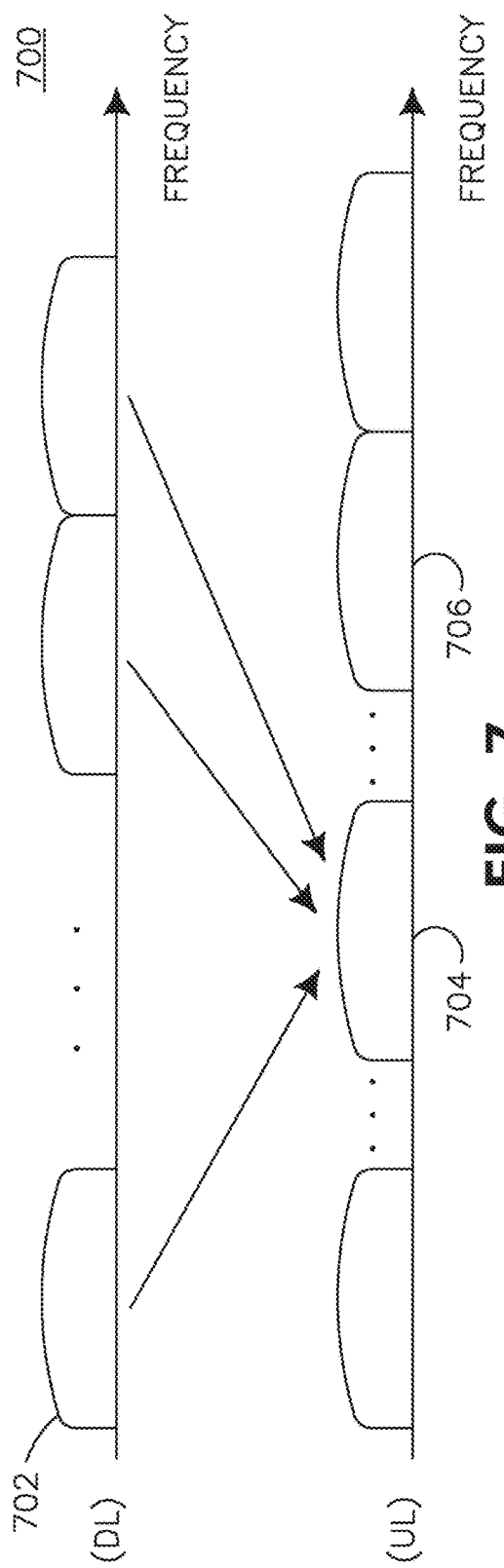
FIG. 7 shows an UL primary carrier for DL control information.

FIG. 7 shows an UL primary carrier for DL control information 700, in accordance with the teachings herein. In FIG. 7, a single UL primary carrier 704 is used to carry the control information for one or more DL component carrier 702. Non-primary uplink carriers 706 may not be used to transmit control information for downlink carriers 702. The primary UL carrier 706 may be an UL anchor carrier, or any other UL carrier.

Figure 8:
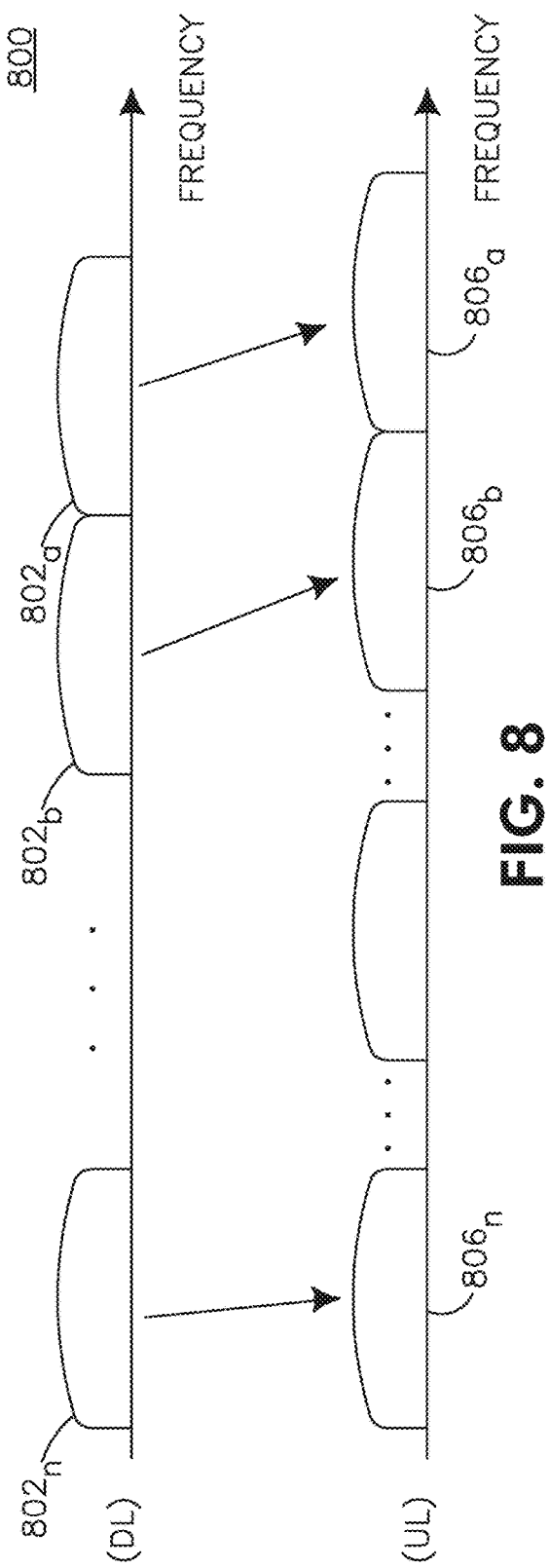
FIG. 8 shows pairing of UL and DL carriers for transmitting DL control information on the UL.

FIG. 8 shows pairing of UL and DL carriers for transmitting control information on the UL 800, in accordance with the teachings herein. In FIG. 8, each DL carrier $802_a$, $802_b$, . . . $802_n$ is paired with a corresponding UL carrier $806_a$, $806_b$, . . . $806_n$, such that control information for each DL carrier $802_a$, $802_b$, . . . $802_n$ is transmitted on the corresponding paired UL carrier $806_a$, $806_b$, . . . $806_n$.

Figure 9:
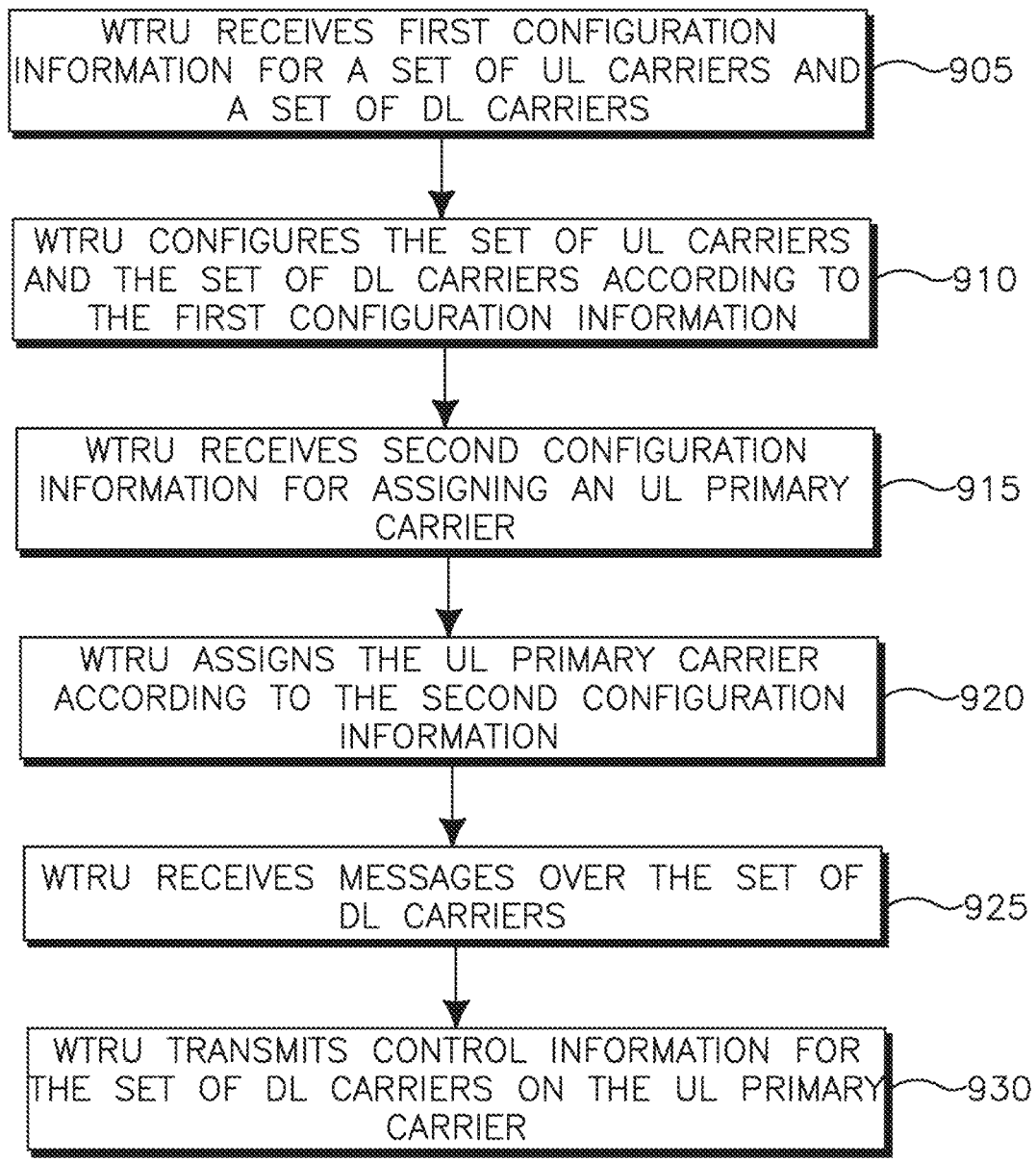
FIG. 9 shows a flow diagram for using an uplink primary carrier for transmitting control information for a set of DL component carriers.

FIG. 9 shows a flow diagram 900 for using an uplink primary carrier for transmitting control information for a set of DL component carriers, in accordance with the teachings herein. At 905, the WTRU receives first configuration information for a set of UL carriers and a set of DL carriers. The first configuration information may be included in one or several different messages. For example, the configuration information for the set of UL carriers may be received in a separate message from the configuration information for the set of DL carriers, or a different subset of UL carriers. At 910, the WTRU configures the set of UL carriers and the set of DL carriers according to the first configuration information. At 915, the WTRU receives second configuration information for an UL primary carrier. The first and second configuration information may be received in a common message, or in separate messages. At 920, the WTRU configures the UL primary carrier according to the second configuration information. At 925, the WTRU receives messages over the set of DL carriers. At 930, the WTRU transmits control information for the set of DL carriers on the UL primary carrier. The WTRU may transmit control information for all or a subset of the set of DL carriers over the UL primary carrier.

Figure 10:
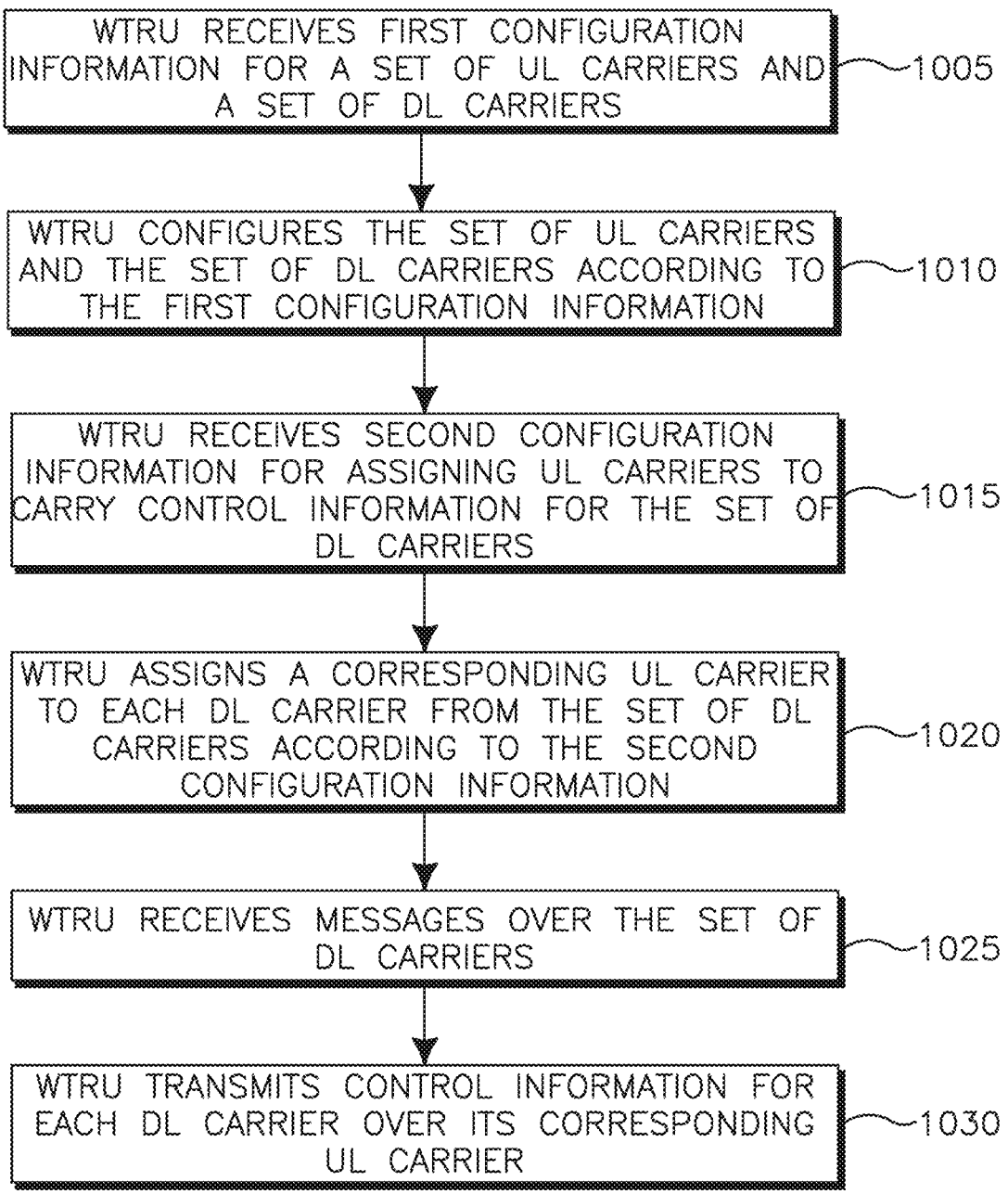
FIG. 10 shows a flow diagram for pairing UL and DL carriers for transmitting control information of DL component carriers on the UL.

FIG. 10 shows a flow diagram 1000 for pairing UL and DL carriers for transmitting control information of DL component carriers on the UL, in accordance with the teachings herein. At 1005, the WTRU receives first configuration information for a set of UL carriers and a set of DL carriers. The first configuration information may be included in one or several different messages. For example, the configuration information for the set of UL carriers may be received in a separate message from the configuration information for the set of DL carriers, or a different subset of UL carriers. At 1010, the WTRU configures the set of UL carriers and the set of DL carriers according to the first configuration information. At 1015, the WTRU receives second configuration information for assigning UL carriers to carry control information for the set of DL carriers. The assigned UL carriers may or may not be anchor or primary carriers. The first and second configuration information may be received in a common message, or in separate messages. At 1020, the WTRU assigns a corresponding UL carrier to each DL carrier from the set of DL carriers according to the second configuration information. At 1025, the WTRU receives messages over the set of DL carriers. At 1030, the WTRU transmits control information for each DL carrier over its corresponding UL carrier. With reference to FIG. 6, the receiving and transmitting of carriers may be done by a transceiver 614, and the configuration and pairing of carriers may be done by a processor 616.

Using IEEE 802.16m multicarrier operation as an example, the control information for each active DL carrier may need to be reported back to the Advanced Base Station (ABS) so that efficient frequency-selective and spatial scheduling may be achieved in the DL. The control information for each active DL carrier may include, but is not limited to, DL channel quality feedback, DL multi-input multi-output (MIMO) feedback, and DL HARQ ACK/NACK. For a DL carrier that has a paired UL carrier, its feedback control information may be configured to transmit on its corresponding UL carrier. For a DL carrier that does not have a paired UL carrier, its feedback control information may be transmitted on the UL primary carrier of the Advanced Mobile Station (AMS). The UL primary carrier may be AMS-specific.

Using LTE-A as an example, let $N_{UL}$ and $N_{DL}$, be the number of aggregated carriers in the uplink and downlink, respectively. $N_{UL}$ may or may not be equal to $N_{DL}$; the latter case referred to as asymmetrical carrier aggregation. Because multiple aggregated carriers are used in LTE-A, channel state information (CSI) or CQI, including precoding matrix index (PMI) and rank information (RI), for each DL component carrier in an aggregated carrier needs to be reported back to the eNB so that efficient frequency-selective and spatial scheduling may be done in the DL. According to the first embodiment, PUCCHs for periodic reporting of CSI and/or CQI for all DL component carriers are configured to transmit on the primary carrier in the UL. PUCCH(s) for periodical reporting of CSI and/or CQI for all downlink carriers are transmitted on the primary carrier designated for PUCCH transmission and may not exist on other non-primary UL carriers. The primary carrier assigned to transmit the PUCCH(s) may carry any type of control information including, but not limited to, PUCCH, CQI, CSI, PMI, RI, ACK/NAK information. HARQ feedback and scheduling requests (SR). The UL primary carrier may be WTRU-specific, and the designation of the UL primary carrier may be signaled to the WTRU via RRC signaling, L1 signaling or MAC control element (CE). Alternatively, the primary carrier may be cell-specific. A LTE-A WTRU may obtain the information about the primary carrier via acquiring the master information block (MIB) or system information block (SIB).

Optionally, PUCCHs for periodic reporting of CSI/CQI for each downlink carrier may be configured to transmit on a corresponding UL carrier paired with the DL carrier. The mapping between UL carrier and DL carrier may be WTRU-specific, and signaled to the WTRU via RRC signaling, L1 signaling or MAC control element (CE). Alternatively, the mapping between uplink carrier and downlink carrier may be cell-specific. A LTE-A WTRU may obtain the information via acquiring the MIB or SIB. The mapping between uplink carrier and downlink carrier may be fixed and specified in the standards.

Periods of CSI and/or CQI reporting of different downlink carriers may be configured to be equal or different. For example, CSI/CQI reporting period of the downlink anchor carrier may be configured to be smaller than CSI/CQI reporting periods of downlink non-anchor carriers. In other words, CSI/CQI reporting periods of downlink non-anchor carriers may be integer multiples of CSI/CQI reporting period of the downlink anchor carrier. In this way, CSI/CQI of the downlink anchor carrier is configured to be reported more frequently than downlink non-anchor carriers. Whether the periods CSI/CQI reporting of different downlink carriers are equal or not, the offset within a reporting period for CST/CQI reporting for different downlink carriers may be configured to be equal or different.

By way of example, assume that the PUCCH is mapped to a primary carrier for all DL carriers as described above. If the as anchor carrier has limited PUCCH resources for CSI/CQI reporting, the network may configure offsets of different carriers to be different so that the total amount of PUCCH resources in any sub-frame is minimized. Regardless of the relative reporting periodicity of the DL carriers, the system frame/sub-frame offset may be configured so that PUCCH reporting for a particular DL carrier does not overlap reporting for other DL carriers. Alternatively, PUCCH reporting may be staggered per DL carrier. One way to accomplish this would be to configure the same PUCCH periodicity for each associated DL carrier but with different subframe offsets for each. Alternatively, the periodic PUCCH may also be configured to alternate reporting for each DL carrier. The PUCCH CSI/CQI reporting may be defined to sequentially switch according to a predetermined list of DL carriers, or may be configured to report with a higher or lower periodicity for a particular carrier. For example, one DL carrier may be reported every two PUCCH frames and two of carriers may be reported every four PUCCH frames. In another example, in order to maintain periodic reporting for any particular carrier, modulo 2 multiples between the reporting rates may be used to fully utilize a periodic PUCCH configuration. For any of these solutions, the existence of the PUCCH transmission may be limited by the DRX or activation/deactivation state of the associated DL carrier. When the WTRU is not receiving PDCCH on a particular DL carrier, if the primary UL carrier has plenty of PUCCH resources to support simultaneous CSI/CQI reporting for multiple downlink carriers, the network may configure offsets of different carriers to be the same so that PUCCHs for different carriers' CSI/CQI reporting are aligned. In this way, the DRX cycle or activation/deactivation state has a low impact on CSI/CQI reporting for multiple downlink carriers.

Although multiple aggregated carriers are used in LTE-A, only one total WTRU data transmission buffer may be maintained. Hence, based on buffer occupancy, only one scheduling request (SR) may be required for the eNB so that uplink channel resources may be scheduled for the WTRU. PUCCH for SR reporting may be configured using the following methods. In one embodiment, PUCCH reporting of SR is configured to be periodic and is transmitted on a primary carrier in the UL. PUCCH(s) reporting of SR may not exist on non primary UL carriers. The UL primary carrier may be WTRU-specific, and signaled to the WTRU via RRC signaling, L1 signaling or MAC control element (CE). WTRU specific UL and DL primary carriers allow for improved load balancing across UL and DL carriers. Alternatively, the primary carrier may be cell-specific. A LTE-A WTRU may obtain the information about the primary carrier via acquiring master information block (MIB) or system information block (SIB). In the cell specific case, all WTRUs with the same primary DL carrier may have the same primary UL carrier. The default mode of operation may use a cell-specific UL primary carrier until a WTRU-specific RRC reconfiguration procedure is applied.

In another embodiment, the PUCCH reporting of SR may be configured to be periodic and may be transmitted on a set of uplink carriers, where the set may include more than one carrier but may be less than the set of all UL carriers. The periods and offset for PUCCHs mapped on different uplink carriers may be configured to be the same or different. If PUCCHs for SR reporting of a WTRU are configured on several uplink carriers in the same sub-frame, the WTRU may transmit on one or a subset of those PUCCHs, which may be specified by the standards.

For PUCCH for SR reporting, it is assumed that the network may determine the UL carrier of the uplink shared channel (UL_SCH) allocation. Alternatively, the WTRU may request UL_SCH resources by transmitting a SR on the UL carrier for which UL resources are requested. In this way, the WTRU may dynamically request an UL_SCH allocation on particular UL carriers. The decision criteria for generating a SR on a particular UL carrier may be traffic volume based and/or relative to the ability of allocations on other UL carriers to support the current UL transmission requirement.

For IEEE 802.16m, with the multicarrier operation, a carrier may be assigned to carry physical (PHY) and/or medium access (MAC) control signaling in addition to data traffic, referred to as a primary carrier, for each Advanced Mobile Station. In TDD mode, one carrier may be used as the primary carrier for both DL and UL. In FDD mode a DL carrier and an UL carrier may be used as a DL primary carrier and an UL primary carrier, respectively. In accordance with the teachings herein, the primary carrier of an AMS may be changed dynamically. Furthermore, the dynamic changing methods disclosed herein may be applied to any of the UL or DL carriers, and any new set of UL and/or DL carriers may be assigned in a dynamic or semi-persistent manner. The dynamic changing methods disclosed herein may be applied to both UL and DL carriers together, or to UL or DL carriers separately in a unidirectional handover procedure.

For each of the primary or anchor carrier methods described herein, the UL primary carrier, anchor carrier or any other carrier may be switched within the configured set of UL carriers. The switching may be initiated by either the WTRU or eNB, and signaled by either RRC, MAC or physical control signaling methods. In this case, the switching may be part of an intra-cell handover procedure. Additionally, the UL primary carrier, anchor carrier or any other carrier may be switched to an UL carrier that is not part of the currently configured set of UL carriers within the current cell. In this case, the switching may be part of an inter-cell handover procedure. The procedure may be initiated by either the eNB or the WTRU.

For LTE-A, an UL carrier may be assigned to carry PUCCH, referred to as a primary carrier or UL anchor carrier, similar to the DL anchor carrier carrying the physical downlink control channel (PDCCH). A primary carrier may be an UL anchor carrier or any other UL carrier. The DL anchor carrier(s) and UL primary carrier(s), including UL anchor carriers, may also be used for carrying HARQ feedback, SRs, and CSI/CQI among other information. Other non-primary UL carriers may not be used for carrying HARQ feedback, SR and CSI/CQI, among other information. In accordance with the teachings herein, the DL anchor carrier(s) and UL primary carrier(s), including UL anchor carriers, may be switched dynamically. Furthermore, the dynamic switching methods disclosed herein may be applied to any of the UL or DL carriers, and any new set of UL and/or DL carriers may be assigned in a dynamic or semi-persistent manner. The dynamic switching methods disclosed herein may be applied to both UL and DL carriers together, or to UL or DL carriers separately in a unidirectional handover or carrier reconfiguration procedures.

A WTRU may switch DL and/or UL carriers, including anchor carriers or primary carriers, during the WTRUs normal operations without handover, or during a handover. Handovers may be either inter-cell or intra-cell, and may be controlled by an eNB or the WTRU may initiate forward handovers. The switching of the DL and/or UL carriers may be dynamic, which is considered fast, or semi-persistent, which is considered slower. The DL and/or UL component carrier switching at the WTRU may be triggered by DL signaling from an eNB or based on preconfigured switching or a hopping pattern. The triggering of DL anchor carrier switching may be eNB or WTRU initiated. The reassignment of the DL primary or anchor carrier may be to a carrier within the current set of DL carriers being received by the WTRU or to a new DL carrier not currently part of the set of active DL carriers for that WTRU. When the new primary or anchor carrier assignment is within the current set of active DL carriers, the WTRU reconfiguration procedure may be optimized so that reset and reestablishment of RLC and PDCP protocols are not required.

Methods for dynamic and semi-persistent switching and unidirectional handover are discussed in detail hereinafter, and may be applied to any kind of carrier including primary carriers, anchor carriers, non-anchor carriers or any active carrier in both the UL and DL directions. Methods described with respect to anchor carriers may interchangeably be applied to primary carriers or non-anchor carriers, and vice versa.

The switching of DL and/or UL component carriers may follow many possible patterns. According to one pattern, the switching is from one component carrier to another component carrier. According to another pattern, the switching may be from one component carrier to another subset of carriers, which may or may not include the triggering carrier that may be an anchor or primary carrier. Alternatively, the switching may be from one component carrier to all component carriers. In another pattern, the switching may be from one subset of component carriers or all component carriers to one component carrier that may be the anchor or primary carrier. According to another pattern, the switching may be from a subset of component carriers to another subset of component carriers or all component carriers in a DL or UL direction. In yet another pattern, the switching may be from all component carriers in a DL or UL direction to a subset of component carriers.

Switching a set of carriers by increasing in the number of carriers is referred to as expansion. Similarly, switching a set of carrier by decreasing the number of carriers is referred to as contraction. DL and/or UL component carrier switching or expansion may be signaled using RRC and/or L1/L2 signaling; for example, the PDCCH the PUCCH, or the medium access control (MAC) layer may be used. An RRC message may be used to signal the switch, or the MAC control element (CE) and the PDCCH may be used to carry the switching signaling to the WTRU. An RRC message may be used to provide component carrier configurations, and the PDCCH or MAC CE may be used to signal the switch. The ability to use PDCCH/PUCCH and/or MAC CE signaling may also be used for just intra-cell carrier switching. Switching the UL or DL anchor carrier(s) or primary carrier(s) may be within the current set of active carriers. An RRC message may also be used to signal the switching or hopping pattern for the WTRU to follow and for inter-cell handovers. Hopping and DL signaling may be used to trigger component carrier switching, where a signal may be transmitted from the eNB to the WTRU through the PDCCH or MAC CE from the time when the WTRU uses a hopping approach. Hopping and DL signaling may start when the WTRU switches the component carrier based on DL signaling. The WTRU may send the acknowledgement to the carrier switch message in order to maintain alignment of active carriers between the WTRU and the eNB when the PDCCH or MAC CE are used to signal carrier switching. Also, a time synchronized switch on a sub-frame boundary may be defined relative to PDCCH or MAC CE reception.

According to one embodiment, the switching of DL and/or UL component carriers may be from one component carrier to another component carrier. This may occur when the WTRU switches from one anchor carrier to another anchor carrier. The PDCCH or the MAC CE may be used to signal the switch to the WTRU. If the switch occurs during handover, the RRC message contained in the handover command may be used to signal the anchor carrier switch from one cell to another cell. The message contained inside the PDCCH or MAC CE or handover command may include any or all of the following information: a starting transmission time interval (TTI), for example, the system frame number (SFN) for the WTRU to monitor in order to capture the new DL anchor carrier or transmit on the new UL carrier; the TTI (for example, the SFN) to be disconnected by the WTRU for the existing UL/DL anchor carrier; how long the WTRU may stay on the new DL/UL anchor carrier and the subsequent anchor carrier that the WTRU will listen to; and a trigger to start an inactivity timer or an on-duration timer for discontinuous reception (DRX) on the new anchor carrier. When switching anchor carriers, the configuration for different carriers may be maintained. Optionally, the configuration for some carriers may change.

Besides using PDCCH or MAC CE to trigger the switching from an existing anchor carrier to another anchor carrier, switching may also follow a hopping pattern which may be signaled via an RRC message. The eNB may use the PDCCH or MAC CE to signal the WTRU to terminate the carrier hopping pattern and request that the WTRU follows the information continued on the PDCCH or the MAC CE to trigger the carrier switching. Alternatively, the eNB may use the PDCCH or MAC CE to activate carrier switching following the hopping pattern signaled by RRC message.

According to another embodiment, the switching of DL and/or component carriers may be from one component carrier to another subset of carriers, which may not include the triggering carrier and may be the anchor carrier only which may be a primary carrier, or all component carriers. This may occur when there is DL data necessitating more DL component carriers to be activated by the anchor carrier, which as previously stated may be a primary carrier. Activation of other DL component carriers may be through the PDCCH or the MAC CE. The PDCCH or MAC CE may also contain an indicator as to which DL component carriers may be activated. The parameters for the carriers to be activated may or may not be the same for each carrier. For example, the inactivity timer for each component carrier may be different. A subset of carriers may be activated at the same time, but depending on the DL transmission activity, certain component carriers may be deactivated by the anchor carrier via the PDCCH or MAC CE. Each of this subset of component carriers may go to sleep autonomously if the DL transmission on that carrier is successfully completed. If this occurs during handover, the activation message may be contained in the handover command.

According to another embodiment, the switching of DL and/or UL component carriers may be from one subset of component carriers or all component carriers to one component carrier, for example, the anchor carrier, which may be a primary carrier. This may occur when some or all of the component carriers are activated from a dormant state for data transmission, then finish the transmission and return to a sleep mode. The switch to deactivate the carriers may be signaled through the PDCCH or MAC CE for each of the subset of component carriers except the anchor (or primary) carrier. Alternatively, the carriers, other than the anchor carrier, may deactivate autonomously upon the expiration of one or more timers. Alternatively, the message may only be contained in PDCCH or MAC CE on the anchor carrier. During this switch, the anchor carrier that remains may be different from the anchor carrier that activates the subset of component carriers. If this occurs during handover, the activation message may be contained in the handover command.

According to another embodiment, the switching of DL and/or UL component carriers may be from a subset of component carriers to another subset of component carriers or to all component carriers. Similarly, the switching may be from all component carriers to a subset of component carriers. The switch may be signaled through the PDCCH or MAC CE on the anchor carrier to the WTRU. Optionally, the message from all active component carriers may be contained in the PDCCH or the MAC CE. Once a WTRU receives the message, the WTRU may deactivate certain component carriers and activate other carriers according to what is being signaled. If this occurs during handover, the activation message may be contained in the handover command. The switching may also occur based on a preconfigured hopping pattern signaled via RRC message.

Switching of the anchor carrier and the active set of carriers may be applied in an inter-cell handover. Any one active UL or DL carrier may be reassigned to be the anchor carrier with PDCCH/PUCCH, or MAC CE signaling without requiring RRC reconfiguration. An explicit signal confirmation may be sent through a HARQ acknowledge signal, although implicit confirmation is also possible, for example by detecting a reassignment of PDCCH or PUCCH for the WTRU on the particular carrier. Existing configurations may be transferred to the new anchor carrier. The configurations may be beyond the PDCCH and PUCCH configurations and include, for example, the DRX cycles and associated timers, the semi-persistent scheduling configuration, the HARQ entity/process assignment and other configurations.

For an infra-cell handover, switching of the anchor or primary carrier, or set of active carriers may be applied for just UL carriers or just DL carriers. This may be considered a unidirectional handover. Only the configuration and operation in that direction is affected by the carrier switching. The carrier switching criteria may be, for example, carrier quality measurements or traffic congestion. The WTRU may use the radio link failure (RLF) procedure or, the eNB may use sound reference signal (SRS) or channel quality measurement (CQI) reception to invoke the procedure. The WTRU may detect RLF on one or more DL component carriers and choose to invoke a DL carrier switching procedure. This DL switching procedure may be uniquely applied to the DL anchor or primary carrier. WTRU-initiated procedure may be accomplished either by RRC, MAC CE, or PUCCH signaling. The eNB may detect criteria for UL component carrier switching from SRS reception on each of the configured UL carriers, or detect criteria for DL component carrier switching from DL CQI reporting received on the UL primary component carrier. The eNB initiated UL or DL component carrier (CC) switching procedures may be accomplished by RRC, MAC CE, or PDCCH signaling.

Figure 11A:
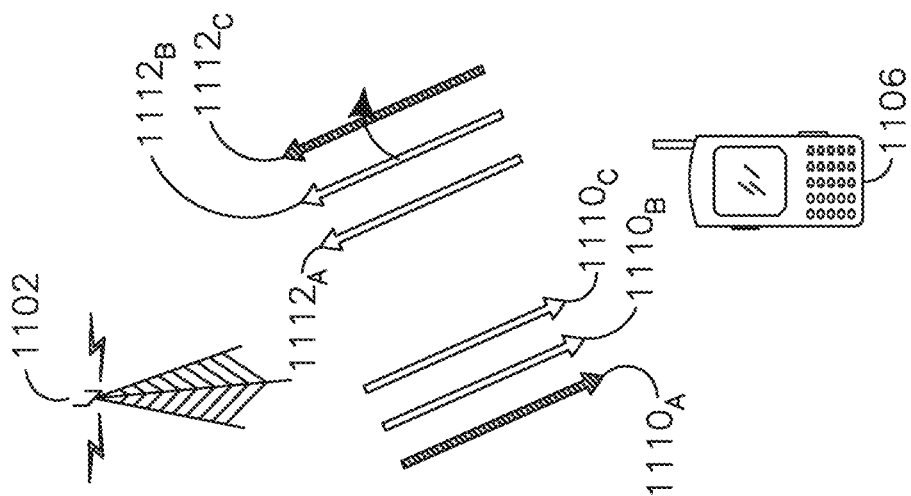
FIGS. 11A, 11B, 12A and 12B show examples of carrier switching on a common eNB.
Figure 11B:
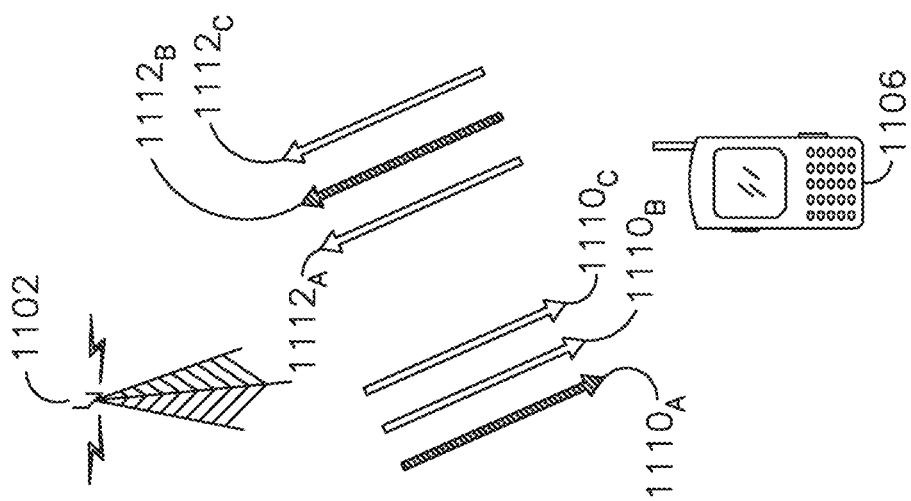

FIGS. 11A, 11B, 12A and 12B show examples of carrier switching on a common eNB. In FIGS. 11A and 11B, DL carriers $1110_A$, $1110_B$, and $1110_C$ and UL carriers $1112_A$, $1112_B$, and $1112_C$ are configured between the eNB 1102 and the WTRU 1106. DL carriers $1110_A$, $1110_B$, and $1110_C$ and UL carriers $1112_A$, $1112_B$, and $1112_C$ may include anchor carriers, primary carriers and non-anchor carriers. In FIGS. 11A and 11B, transmissions exist on any carrier, $1110_A$, $1110_B$, $1110_C$, $1112_A$, $1112_B$, and $1112_C$ that are currently configured, activated and have a valid DL scheduling allocation or UL grant. In FIG. 11A, a DL primary or anchor carrier is configured on DL carrier $1110_A$, and a UL primary or anchor carrier is configured on UL carrier $1112_B$, as indicated by shading. In FIG. 11B, the UL primary carrier that previously existed on UL carrier $1112_B$ is switched to UL carrier $1112_C$ within the set of configured carriers. For example, DL primary or anchor carrier $1112_B$ may be switched to new UL primary or anchor carrier $1112_C$. Switching in the UL and DL may occur independently, or unidirectionally, such that a DL carrier may not be switched when an UL carrier is switched.

Figure 12B:
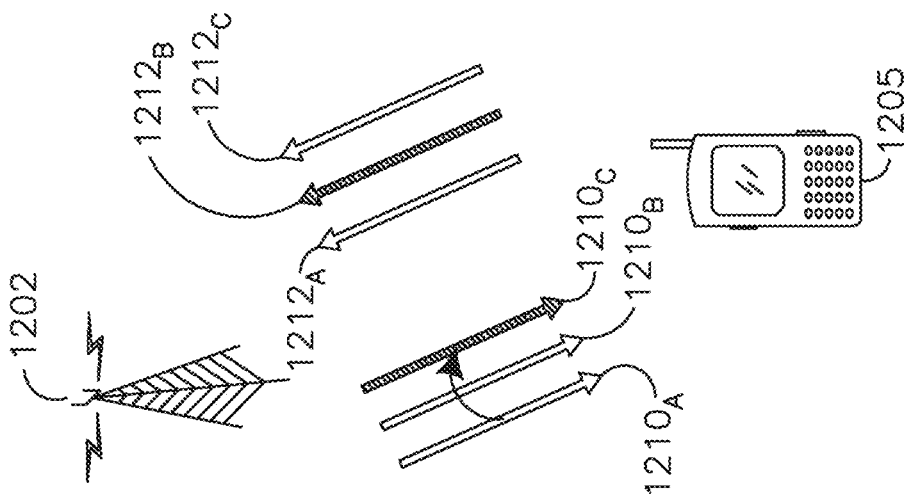
Figure 12A:
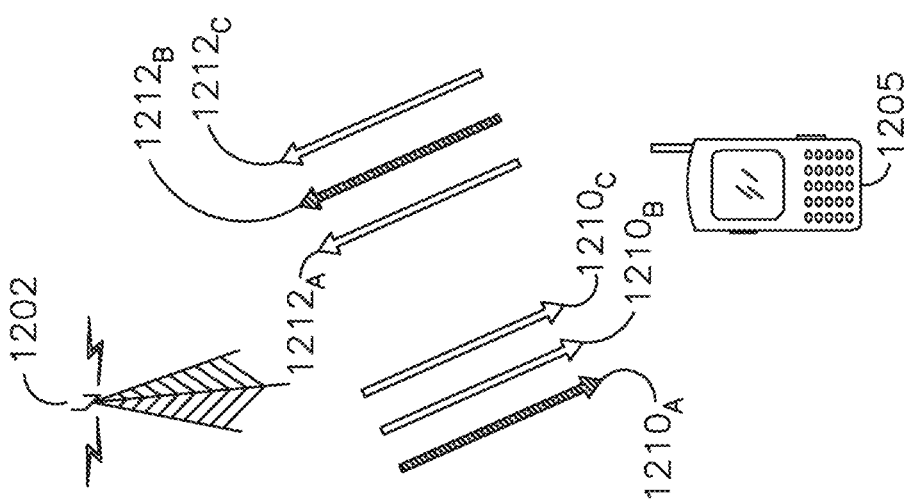

Similarly, in FIGS. 12A and 12B, DL carriers $1210_A$, $1210_B$, and $1210_C$ and UL carriers $1212_A$, $1212_B$, and $1212_C$ are configured between the eNB 1202 and the WTRU 1206. DL carriers $1210_A$, $1210_B$, and $1210_C$ and UL carriers $1212_A$, $1212_B$, and $1212_C$ may include anchor carriers, primary carriers and non-anchor carriers. In FIGS. 12A and 12B, transmissions exist on any carrier, $1210_A$, $1210_B$, and $1210_C$, $1212_A$, $1212_B$, and $1212_C$ that are currently configured, activated and have a valid DL scheduling allocation or UL grant. In FIG. 12A, a DL primary or anchor carrier is configured on DL carrier $1210_A$, and a UL primary or anchor is configured DL carrier $1212_B$, as indicated by shading. In FIG. 12B, the DL primary carrier that previously existed on DL carrier $1210_A$ are switched to DL carrier $1210_C$ within the set of configured carriers. For example, DL primary or anchor carrier $1210_A$ may be switched to new DL primary or anchor carrier $1210_C$. Switching in the UL and DL may occur independently, or unidirectionally, such that an UL carrier may not be switched when a DL carrier is switched.

FIGS. 11A, 11B, 12A and 12B illustrate examples of carrier switching a common eNB within the set of existing configured carriers. In these examples a primary or anchor carrier is switched within the set of currently configured carriers. In a similar manner, carriers may be switched outside the set of previously configured carriers, by configuring a new carrier and then executing the switch. Moreover, the set of configured carriers may be expanded or contracted during a carrier switch. Similar procedures may be applied to non-primary or non-anchor carriers.

Figure 13B:
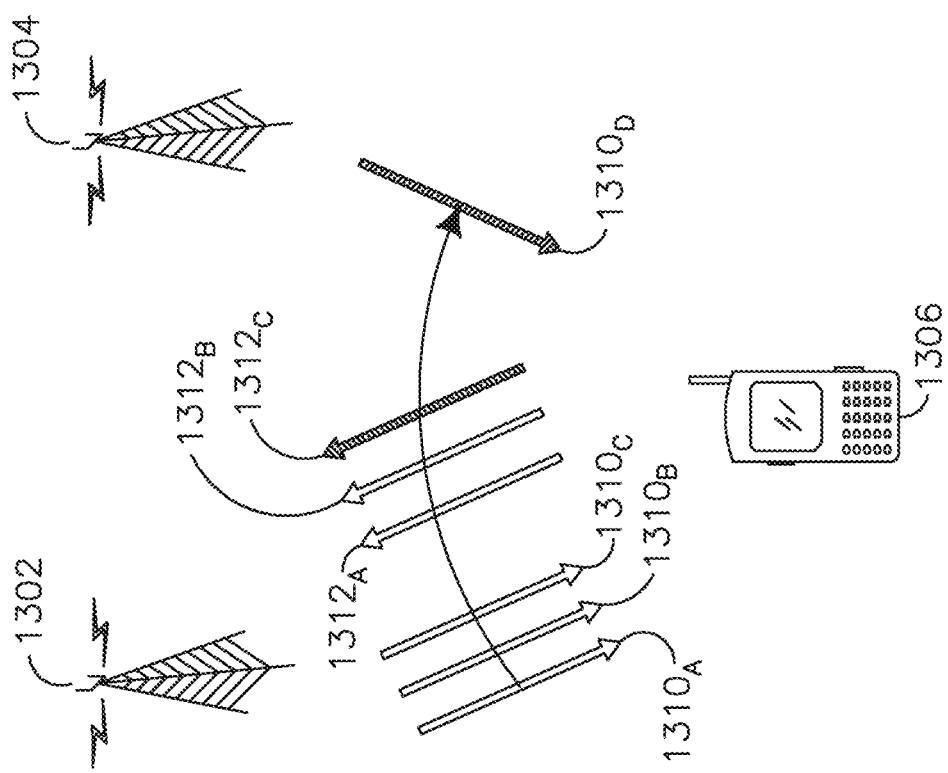
FIGS. 13A, 13B, 14A and 14B show examples of carrier switching from one eNB to another eNB, referred to as unidirectional handovers.
Figure 13A:
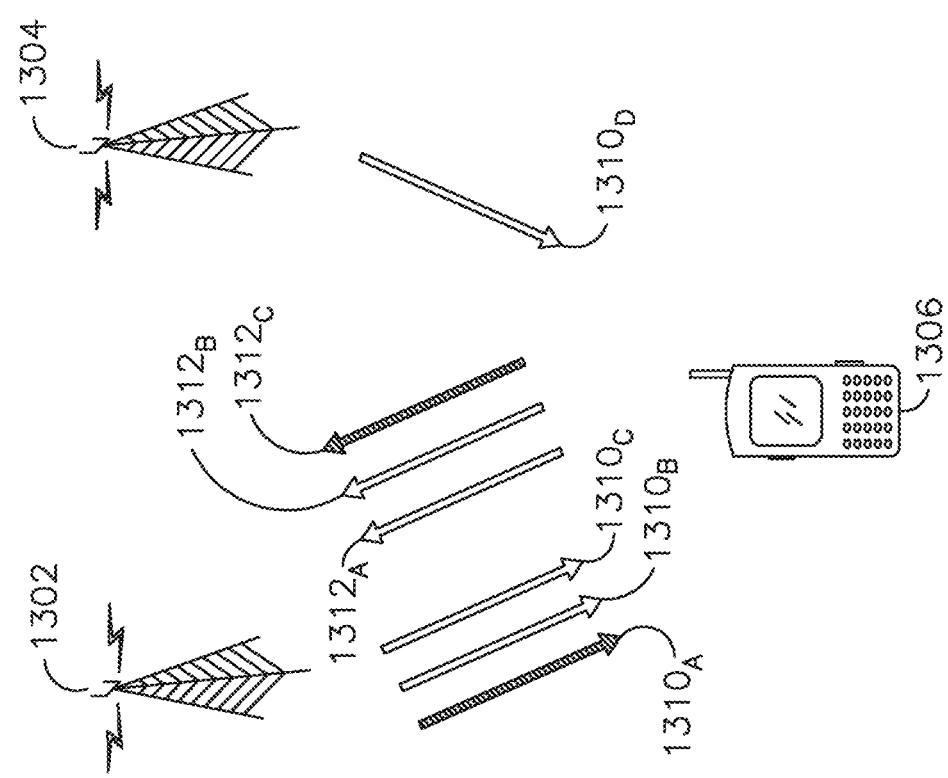

FIGS. 13A, 13B, 14A and 14B show examples of carrier switching from one eNB to another eNB, referred to as unidirectional handovers. In FIGS. 13A and 13B, DL carriers $1310_A$, $1310_B$, and $1310_C$ and UL carriers $1312_A$, $1312_B$, and $1312_C$ are configured between the eNB 1302 and the WTRU 1306. Also, DL carrier $1310_D$ is configured between the eNB 1304 and the WTRU 1306. DL carriers $1310_A$, $1310_B$, $1310_C$ and $1310_D$ and UL carriers $1312_A$, $1312_B$, and $1312_C$ may include anchor carriers, primary carriers and non-anchor carriers. In FIGS. 13A and 13B, transmissions exist on any carrier, $1310_A$, $1310_B$, $1310_C$, $1310_D$ $1312_A$, $1312_B$, and $1312_C$ that are currently configured, activated and have a valid DL scheduling allocation or UL grant. In FIG. 13A a DL primary or anchor carrier is configured DL carrier $1310_A$ and a UL primary or anchor is configured UL carrier $1312_C$, as indicated by shading. In FIG. 13B, the DL primary carrier that previously existed on DL carrier $1310_A$ are switched to configured carrier $1310_D$ on eNB 1304 as part of a unidirectional handover. For example, DL primary or anchor carrier $1310_A$ may be switched to new DL primary or anchor carrier $1310_D$ on new eNB 1304. Switching in the UL and DL may occur independently, or unidirectionally, such that a DL carrier may not be switched when an UL carrier is switched.

Figure 14B:
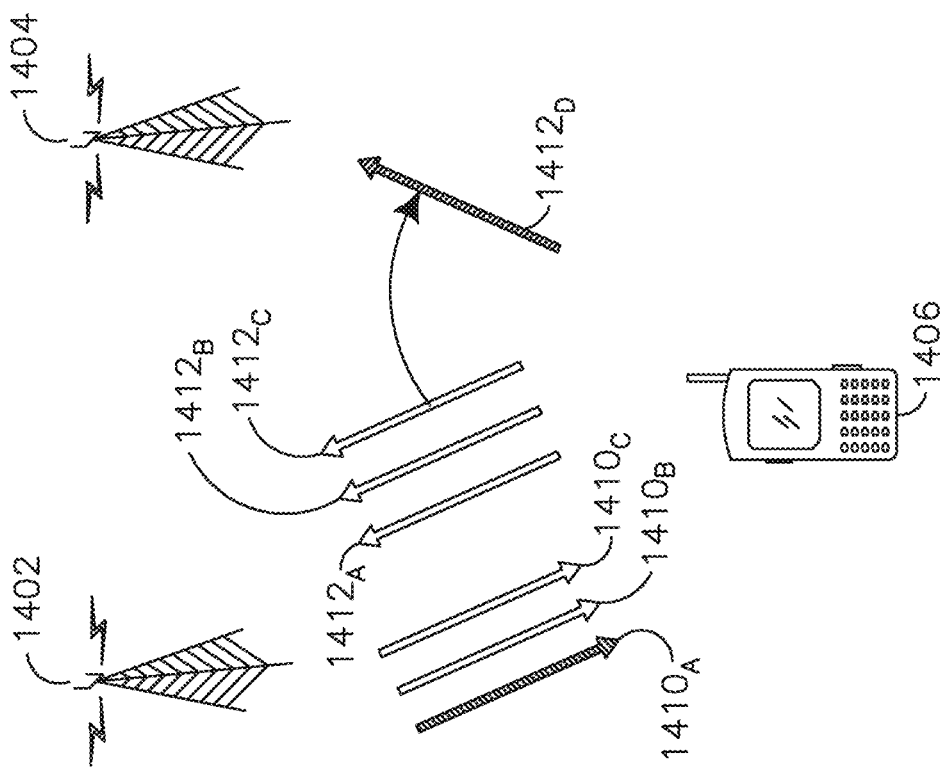
Figure 14A:
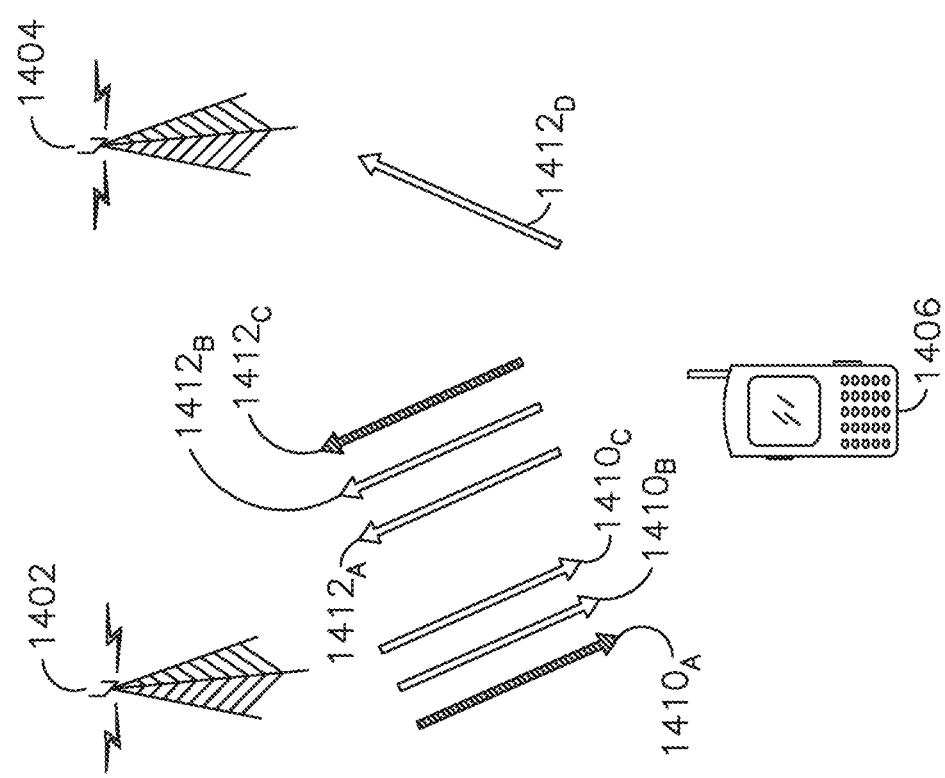

In FIGS. 14A and 14B, DL carriers $1410_A$, $1410_B$, and $1410_C$ and UL carriers $1412_A$, $1412_B$, and $1412_C$ are configured between the eNB 1402 and the WTRU 1406. Also, UL carrier $1412_D$ is configured between the eNB 1404 and the WTRU 1406. DL carriers $1410_A$, $1410_B$, $1410_C$, and $1410_D$ and UL carriers $1412_A$, $1412_B$, and $1412_C$ may include anchor carriers, primary carriers and non-anchor carriers. In FIGS. 14A and 14B, transmissions exist on any carrier $1410_A$, $1410_B$, $1410_C$, $1412_A$, $1412_B$, $1412_C$ and $1412_D$ that are currently configured, activated and have a valid DL scheduling allocation or UL grant. In FIG. 14A, a DL primary or anchor carrier is configured DL carrier $1410_A$, and a UL primary or anchor carrier is configured UL carrier $1412_C$, as indicated by shading. In FIG. 14B, the UL primary carrier that previously existed on UL carrier $1412_C$ are switched to configured UL carrier $1412_D$ on eNB 1404 as part of a unidirectional handover. For example, UL primary or anchor carrier $1412_C$ may be switched to new UL primary or anchor carrier $1412_D$ on new eNB 1404. Switching in the UL and DL may occur independently, or unidirectionally, such that a DL carrier may not be switched when an UL carrier is switched.

FIGS. 13A, 13B, 14A and 14B illustrate examples of carrier switching between different eNBs (i.e. unidirectional handovers) within the set of existing configured carriers. In these examples a primary or anchor carrier is switched within the set of currently configured carriers. In a similar manner, carriers may be switched outside the set of previously configured carriers, by configuring a new carrier on the target eNB and then executing the switch. Moreover, the set of configured carriers may be expanded or contracted during a carrier switch, on either the existing eNB or target eNB. It should also be noted that similar procedures may be applied to non-primary or non-anchor carriers.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for multicarrier wireless communications comprising:
   receiving, by a wireless transmit/receive unit (WTRU), a first radio resource control (RRC) message comprising a first configuration information that indicates a primary uplink (UL) carrier to be used to carry a first control type information, wherein the first control type information is associated with at least one downlink (DL) carrier of a first set of DL carriers;
   transmitting, by the WTRU, the first control type information associated with the at least one DL carrier of the first set of DL carriers via a physical uplink control channel (PUCCH) transmission on the primary UL carrier;
   receiving, by the WTRU, a second RRC message comprising a second configuration information that indicates a non-primary UL carrier to carry a second control type information, wherein the second control type information is associated with at least one DL carrier of a second set of DL carriers; and
   transmitting, by the WTRU, the second control type information associated with the at least one DL carrier of the second set of DL carriers via a PUCCH transmission on the non-primary UL carrier.

2. The method of claim 1, wherein the first control type information associated with the at least one DL carrier of the first set of DL carriers or the second control type information associated with the at least one DL carrier of the second set of DL carriers comprises one or more of a hybrid automatic request (HARQ) feedback, a channel quality information (CQI), or a channel state information (CSI).

3. A wireless transmit/receive unit (WTRU) for multicarrier wireless communications comprising:
   a processor configured to at least:
   receive a first radio resource control (RRC) message comprising a first configuration information that indicates a primary uplink (UL) carrier to be used to carry a first control type information, wherein the first control type information is associated with at least one downlink (DL) carrier of a first set of DL carriers;
   transmit the first control type information associated with the at least one DL carrier of the first set of DL carriers via a physical uplink control channel (PUCCH) transmission on the primary UL carrier;
   receive a second RRC message comprising a second configuration information that indicates a non-primary UL carrier to carry a second control type information, wherein the second control type information is associated with at least one DL carrier of a second set of DL carriers; and transmit the second control type information associated with the at least one DL carrier of the second set of DL carriers via a PUCCH transmission on the non-primary UL carrier.

4. The WTRU of claim 3, wherein the first control type information associated with the at least one DL carrier of the first set of DL carriers or the second control type information associated with the at least one DL carrier of the second set of DL carriers comprises one or more of a hybrid automatic request (HARQ) feedback, a channel quality information (CQI), or a channel state information (CSI).

5. The method of claim 1, further comprising receiving a medium access control (MAC) control element (CE) indicating activation of the non-primary UL carrier among the set of UL carriers.

6. The WTRU of claim 3, wherein the processor is configured to receive a medium access control (MAC) control element (CE) indicating activation of the non-primary UL carrier.

\* \* \* \* \*

UNITED STATES PATENT AND TRADEMARK OFFICE
CERTIFICATE OF CORRECTION

PATENT NO. : 11,134,477 B2
APPLICATION NO. : 14/990333
DATED : September 28, 2021
INVENTOR(S) : Stephen E. Terry et al.

Page 1 of 2

It is certified that error appears in the above-identified patent and that said Letters Patent is hereby corrected as shown below:

In the Specification

Column 7, Line 3: after "periods" insert --of--

Column 10, Line 40: replace "continued" with --contained--

Column 11, Line 48: replace "infra-cell" with --intra-cell--

In the Claims

Column 14, Line 49: delete the text beginning "3. A wireless transmit/receive unit (WTRU) for multicar-" and ending "UL carrier." in Column 15, Line 4, and insert the following claim:
--3. The method of claim 1, further comprising receiving a medium access control (MAC) control element (CE) indicating activation of the non-primary UL carrier.--

Column 15, Line 5: delete the text beginning "4. The WTRU of claim 3, wherein the first control type" and ending "(CQI), or a channel state information (CSI)." in Column 15, Line 11, and insert the following claim:
--4. A wireless transmit/receive unit (WTRU) for multicarrier wireless communications comprising:
    a processor configured to at least:
    receive a first radio resource control (RRC) message comprising a first configuration information that indicates a primary uplink (UL) carrier to be used to carry a first control type information, wherein the first control type information is associated with at least one downlink (DL) carrier of a first set of DL carriers;
    transmit the first control type information associated with the at least one DL carrier of the first set of DL carriers via a physical uplink control channel (PUCCH) transmission on the primary UL carrier;
    receive a second RRC message comprising a second configuration information that indicates a non-primary UL carrier to carry a second control type information, wherein the second control type information is associated with at least one DL carrier of a second set of DL carriers; and Signed and Sealed this
Fourteenth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,134,477 B2 transmit the second control type information associated with the at least one DL carrier of the second set of DL carriers via a PUCCH transmission on the non-primary UL carrier.--

Column 15, Line 12: delete the text beginning "5. The method of claim 1, further comprising receiving a" and ending "set of UL carriers." in Column 15, Line 15, and insert the following claim:
--5. The WTRU of claim 4, wherein the first control type information associated with the at least one DL carrier of the first set of DL carriers or the second control type information associated with the at least one DL carrier of the second set of DL carriers comprises one or more of a hybrid automatic request (HARQ) feedback, a channel quality information (CQI), or a channel state information (CSI).--

Column 15, Line 16: replace "claim 3" with --claim 4--